United States Patent
Saban et al.

(10) Patent No.: US 10,109,315 B2
(45) Date of Patent: Oct. 23, 2018

(54) DEVICES, SYSTEMS AND METHODS FOR AUTO-DELAY VIDEO PRESENTATION

(71) Applicant: EyesMatch Ltd., Road Town, Tortola (VG)

(72) Inventors: Ofer Saban, Vienna, VA (US); Nissi Vilcovsky, Tokyo (JP)

(73) Assignee: EYESMATCH LTD, Road Town, Tortola (VG)

( * ) Notice: Subject to any disclaimer, the term of this patent is extended or adjusted under 35 U.S.C. 154(b) by 34 days.

(21) Appl. No.: 14/992,772

(22) Filed: Jan. 11, 2016

(65) Prior Publication Data

US 2016/0127710 A1 May 5, 2016

Related U.S. Application Data

(63) Continuation-in-part of application No. 14/253,819, filed on Apr. 15, 2014, now Pat. No. 9,269,157.

(Continued)

(51) Int. Cl.
| | |
|---|---|
| *H04N 9/80* | (2006.01) |
| *G11B 27/00* | (2006.01) |
| *G11B 27/34* | (2006.01) |
| *G02B 5/08* | (2006.01) |
| *G06F 3/01* | (2006.01) |
| *G09F 19/16* | (2006.01) |
| *G09F 27/00* | (2006.01) |
| *G06T 11/00* | (2006.01) |
| *H04N 1/62* | (2006.01) |

(Continued)

(52) U.S. Cl.
CPC .............. *G11B 27/005* (2013.01); *G02B 5/08* (2013.01); *G06F 3/011* (2013.01); *G06F 3/017* (2013.01); *G06T 11/00* (2013.01); *G09F 19/16* (2013.01); *G09F 27/00* (2013.01); *G09G 5/18* (2013.01); *G11B 27/34* (2013.01); *H04N 1/622* (2013.01); *H04N 5/2624* (2013.01); *H04N 5/77* (2013.01); *H04N 7/144* (2013.01); *A47F 2007/195* (2013.01); *G06K 9/00369* (2013.01); *H04N 5/2628* (2013.01); *H04N 2005/2726* (2013.01)

(58) Field of Classification Search
CPC .................................................. G11B 27/005
USPC ........................................................ 386/248
See application file for complete search history.

(56) References Cited

U.S. PATENT DOCUMENTS

2003/0202775 A1* 10/2003 Junkersfeld ............ H04N 5/783
386/264

\* cited by examiner

*Primary Examiner* — William C Vaughn, Jr.
*Assistant Examiner* — Daniel Tekle
(74) *Attorney, Agent, or Firm* — Womble Bond Dickinson (US) LLP; Joseph Bach, Esq.

(57) ABSTRACT

A computer implemented method for automatic presentation of delayed video. During normal operation real-time video feed is sent to a digital screen for presentation and is also sent to memory for storage. When a delay trigger is issued, the system either freezes the frame presented in that instance or stores a time indicator. The system then monitors delay time and, when the delay time is reached, the system starts fetching frames from the memory, starting either from the frame immediately following the frozen frame or from the frame that was stored at the time indicator, and sends these frames to the digital screen for presentation. The system then monitors delay period and, when the delay period arrive, the system reverts to normal mode wherein real-time video feed is sent to a digital screen for presentation and is also sent to memory for storage.

16 Claims, 19 Drawing Sheets

Related U.S. Application Data which is a continuation-in-part of application No. 13/843,001, filed on Mar. 15, 2013, now Pat. No. 8,982,109, which is a continuation-in-part of application No. 13/088,369, filed on Apr. 17, 2011, now Pat. No. 8,624,883, which is a continuation of application No. 11/817,411, filed as application No. PCT/IL2006/000281 on Mar. 1, 2006, now Pat. No. 7,948,481.

(60) Provisional application No. 60/656,885, filed on Mar. 1, 2005, provisional application No. 60/656,884, filed on Mar. 1, 2005, provisional application No. 61/738,957, filed on Dec. 18, 2012, provisional application No. 61/892,368, filed on Oct. 17, 2013, provisional application No. 61/862,025, filed on Aug. 4, 2013, provisional application No. 62/101,397, filed on Jan. 9, 2015.

(51) Int. Cl.

| | | |
|---|---|---|
| *H04N 5/262* | (2006.01) | |
| *H04N 7/14* | (2006.01) | |
| *H04N 5/77* | (2006.01) | |
| *G09G 5/18* | (2006.01) | |
| H04N 5/272 | (2006.01) | |
| A47F 7/19 | (2006.01) | |
| G06K 9/00 | (2006.01) | |

DEVICES, SYSTEMS AND METHODS FOR AUTO-DELAY VIDEO PRESENTATION

CROSS-REFERENCE TO RELATED APPLICATIONS

This application is a Continuation-in-Part of and claims the benefit of, U.S. patent application Ser. No. 14/253,819, filed Apr. 15, 2014, which is a Continuation-in-Part of U.S. application Ser. No. 13/843,001, filed Mar. 15, 2013 (now U.S. Pat. No. 8,982,109 issued Mar. 17, 2015), which is a Continuation-in-Part of U.S. application Ser. No. 13/088,369, filed Apr. 17, 2011 (now U.S. Pat. No. 8,624,883 issued Jan. 7, 2014), which is a continuation of U.S. patent application Ser. No. 11/817,411, filed Aug. 30, 2007 (now U.S. Pat. No. 7,948,481 issued May 24, 2011), which is a National Phase Application of PCT International Application No. PCT/IL2006/000281, International Filing Date Mar. 1, 2006, which claims the benefit of U.S. Provisional Application No. 60/656,884, filed Mar. 1, 2005 and U.S. Provisional Application No. 60/656,885, filed Mar. 1, 2005. U.S. patent application Ser. No. 13/843,001 further claims the priority benefit of U.S. Provisional Application No. 61/738,957, filed Dec. 18, 2012. U.S. patent application Ser. No. 14/253,819 further claims the priority benefit of U.S. Provisional Application No. 61/892,368, filed Oct. 17, 2013 and U.S. Provisional Application No. 61/862,025, filed Aug. 4, 2013. The entire disclosures of all of the above listed applications are incorporated herein by reference.

This application also claims the benefit of, and priority to, U.S. Provisional Patent Application No. 62/101,397, filed on Jan. 9, 2015, entitled "Provisional of Computerized virtual digital mirror control features and UI (user interface), as well as product and application design flow to improve the usability of the device/service the user experience and the engagements between sales associate/stylists with customers in the store and on the go," the entire disclosure of which is hereby incorporated herein by reference.

TECHNICAL FIELD

The invention relates generally to imaging and display systems and, more particularly, to monitors, and interactive displays, e.g., in retail and/or service environments, medical or home situations, video conferencing, gaming, and the like. Specific implementations relate to virtualizing a mirror in situations where users expect to see a mirror, e.g., in trying on apparel. Another specific implementation relate to situations where a natural appearance is preferable over standard video image, such as in, e.g., video conferencing.

BACKGROUND

The conventional mirror (i.e., reflective surface) is the common and most reliable tool for an individual to explore actual self-appearance, in real time. A few alternatives have been proposed around the combination of a camera and a screen to replace the conventional mirror. However, these techniques are not convincing and are not yet accepted as a reliable image of the individual as if he was looking at himself in a conventional mirror. This is mainly because the image generated by a camera is very different from an image generated by a mirror.

In U.S. application Ser. No. 13/843,001, we proposed a novel technology (computerized method) to address the challenges of converting and transforming a still image or 2D/3D video created by one or more cameras, with or without other sensors, into a mirror or video conference experience.

SUMMARY OF THE INVENTION

In this disclosure we describe a computerized technique that takes a real-time video and enables automatic presentation of delayed video. Such a feature is beneficial in various scenarios, such as when the system is implemented as a digital mirror and the user would like to have a try-on session to try on a clothing articles and see how it looks from all directions, including the back. Using a standard mirror a user cannot see how the article of clothing looks from the back. Using this technique in a digital mirror enables a person to see the article in 360 degrees.

In another implementation the system can be used for training purposes. For example, when a dancer would like to see how a particular move was executed or when a golfer would like to view how the swing was executed. Using a standard video recorder, the user would have to start the recording, go and execute the move, then go back to the recorder, rewind, and view the recorded video, which interferes with the flow of the training. Conversely, using the disclosed embodiments, the user is able to focus on the move and when the move is completed the user merely has to look at the screen and view an automatic "instant replay" of the move, thus not interfering with the flow of the training. Moreover, after the replay is completed the system automatically reverts to normal mode, so the user does not have to interact with the camera at all.

The trigger to enter the delay mode may be done in many ways, for example, by simply providing the user with a button to press or click, or by analyzing the video stream and based on the analysis issuing a trigger. The analysis may look for a specific move by the user, for example, the user starts to turn, or it may be look for a specific item in the image. For example, if the system is used for golf training, the analysis may look for a golf club being raised beyond a preset height—indicating that the user is executing a golf swing.

In one aspect a computer implemented method for operating a system having a monitor, a camera, and a processor, so as to sequentially display a real-time video stream and a delayed video stream on the monitor to enable a user an enhanced experience of a viewing session, is described comprising: on a device having the processor and a memory, storing a program for execution by the processor, the program including instructions for: at each session performing the steps: obtaining live video feed from the camera; simultaneously sending the video feed to the monitor to be displayed as the real-time video stream and saving the video feed as frames in the memory; upon receiving an indication to present delayed video stream, fetching the frames from the memory and sending to the monitor for display as a delayed video stream, starting from a frame that was stored a present N seconds prior to receiving the indication, and, after fetching a series of frames stretching a preset of M seconds, stopping the fetching and reverting to sending the video feed to the monitor for display as real-time video stream.

According to another aspect, a computer implemented method for operating a system having a monitor, a camera, and a processor, so as to sequentially display a real-time video stream and a delayed video stream on the monitor to enable a user an enhanced experience of a viewing session is provided, comprising: setting a delay period of N seconds;

setting a recording length of M second; obtaining live video feed from the camera; simultaneously sending the video feed to the monitor to be displayed as the real-time video stream and saving the video feed as frames in the memory; upon receiving a trigger, performing: indicating a frame stored at the time of the trigger as a first frame; counting N seconds and then fetching the frames from the memory and sending to the monitor for display as a delayed video stream, starting from the first frame; after fetching a series of frames for M seconds, stopping the fetching and reverting to sending the video feed to the monitor for display as real-time video stream.

According to yet other aspects, a computer implemented method for automatic presentation of delayed video is provided, comprising: during normal operation mode sending real-time video from a camera to a digital screen for presentation and simultaneously sending the real-time video to memory for storage; when a delay trigger is issued entering delay mode and performing one of: freezing a frame being presented in an instance the trigger was issued but continue sending the real-time video to memory for storage or, storing a time indicator representing the time the trigger was issued but continuing sending real-time video from a camera to a digital screen for presentation and simultaneously sending the real-time video to memory for storage; monitoring a delay time and, when the delay time is reached, starting to fetch frames from the memory, starting either from a frame immediately following the frozen frame or from a frame that was stored at the time indicator, and sending these frames to the digital screen for presentation; monitoring a delay period and, when the delay period is reached, revering to normal mode wherein the real-time video feed is sent to the digital screen for presentation and is also sent to the memory for storage.

In the method, the delay trigger may be generated by continuously analyzing the video feed and issuing the delay trigger when it is determined that the user is performing a trigger motion. The delay trigger may also be generated by continuously analyzing the video feed and issuing the delay trigger when it is determined that an object in the image has moved a prescribed distance. The delay trigger may further be generated by continuously analyzing the video feed and issuing the indication when it is determined that a user has entered field of view of the camera. The delay trigger may be generated by the user pressing or clicking a trigger button. The method may further comprise: flipping each frame of the video feed about a vertical axis so as to reverse right and left sides of the image; and applying a transformation mapping to each frame of the video feed to modify the frames such that they appear to mimic a reflection of a mirror, to thereby obtain transformed frames. The method may further comprise enabling the user to pause the replay of the delayed video. The length of the delay period may be configured to be enough time to allow the user to turn around. The method may further comprise overlaying graphics over the real-time video during the period of the delay time. The program may further comprise instructions for generating a model mask to enable changing a color of the clothing item. The model mask may comprise a plurality of layers, having at least color layer and texture layers. The program may further comprise instructions for generating a split screen on the monitor and displaying the real-time video on one side of the screen and playing the delayed videos on the other half.

In additional embodiments the product mechanical design and appearance are disclosed, to enhance the usability and functionality and the user experience overall. The my system comprise: an enclosure configured to house therein a processor, the enclosure having an extension; an optical sensor housing coupled to the extension; a processor housed within the enclosure, the processor comprising a memory and a video engine and having an output configured to sending digital images to a digital screen; an optical sensor housed within the optical sensor housing and having means to send images to the processor; and an attachment mechanism configured to attach the enclosure to a back of a digital screen.

According to further aspects, a program may be stored in the system that, when executed by the processor causes the system to display a mirror-mimicking image on the monitor and/or to perform automatic delay mode presentation as described in various embodiments herein.

Also described herein is a non-transitory computer-readable storage medium for operating a monitor, a camera, and a processor, so as to display a delayed video clip on the monitor. In certain embodiments, on a device having the processor and a memory storing a program for execution by the processor, the program includes instructions for operating in normal mode and delay mode wherein in a normal mode the program includes instructions for receiving a real-time video stream from the camera and sending the real-time video stream to be both displayed on the screen and stored in memory; and upon entering delay mode performing: indicating a trigger time at the time of receiving the trigger; counting N seconds from the trigger time and then fetching the frames from the memory and sending to the monitor for display as a delayed video stream, starting from a frame that was stored at the trigger time, and simultaneously continuing to stored the video stream to the memory; after fetching a series of frames for M seconds, stopping the fetching and reverting to sending the video feed to the monitor for display as real-time video stream. In certain embodiments, the program includes instructions for a mirror-mimicking mode for displaying the mirror-mimicking image on the monitor.

Also described herein is a computer system for operating a monitor, a camera, and a processor, so as to display a mirror-mimicking image on the monitor. The computer system includes, on a device having the processor and a memory storing a program for execution by the processor, the program including instructions for sensing for a user, initiating a delay mode for automatically displaying a delayed video clip on the monitor and reverting to real-time video upon termination of the presentation of the delayed clip. The program may also include instructions for performing frame grabbing of an image captured by the camera, performing element selection to obtain selected element from the frame, generating a mask corresponding to the selected element, selecting a new color, applying the mask to the new color to generate new image, and displaying the new image on the monitor. That is, the delay mode described herein may implemented with or without the other features described herein, such as mirrorizing the video, applying masks and changing colors, determining BMI, etc.

BRIEF DESCRIPTION OF THE DRAWINGS

The accompanying drawings, which are incorporated into this specification, illustrate one or more exemplary embodiments of the inventions disclosed herein and, together with the detailed description, serve to explain the principles and exemplary implementations of these inventions. One of skill in the art will understand that the drawings are illustrative only, and that what is depicted therein may be adapted based on the text of the specification and the spirit and scope of the teachings herein.

In the drawings, where like reference numerals refer to like reference in the specification:

FIG. 3 illustrates an augmented reality module that can replace a body part, color, orientation and texture of an item or object in the foreground or background of the image, e.g., the module can add hair to the user, change the user's eyes, skin and hair color, can change the pose of the eyes and the like.

DETAILED DESCRIPTION

Figure 1:
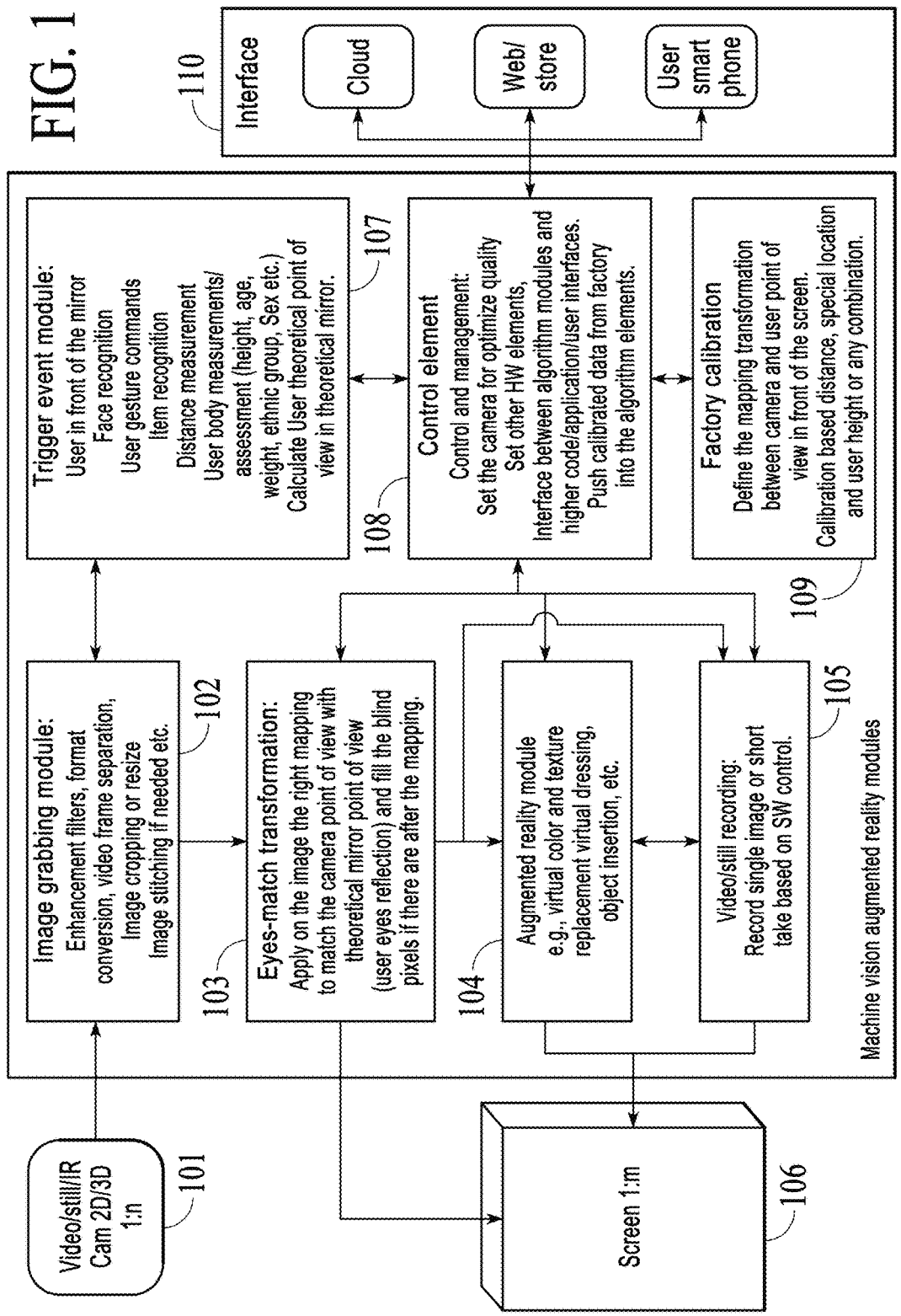
FIG. 1 illustrates a system block diagram for an augmented reality platform supporting a real-time or recorded video/image.

The following examples illustrate some embodiments and aspects of the invention. It will be apparent to those skilled in the relevant art that various modifications, additions, substitutions, and the like can be performed without altering the spirit or scope of the invention, and such modifications and variations are encompassed within the scope of the invention as defined in the claims which follow. The following examples do not in any way limit the invention.

Embodiments of the present invention solve problems relating to color changes, multi level user identification and body measurements. A virtual calibrated camera is provided, capable of providing augmented reality features, for example, color, texture, shape manipulation of body items or background in virtual mirror or video conference applications. It is also capable of performing body measurements, body monitoring for commercial, security and healthcare applications.

Specifically, accurate segmentation of objects and/or elements out of an image or video is one of the biggest challenges in the present field. Known techniques for solving this problem involved a clear tradeoff between accuracy and speed. Prior to the present invention, there is no satisfactory solution to the problem. Use of an infrared (IR) camera with three-dimensional (3D) depth measurement is one approach in the industry; however, quality of the approach suffers. For example, edges, image distortion, and/or low resolution misalignment between the IR and regular cameras prevent successful and convincing segmentation. Chromatic separation and edge detection techniques are very demanding from a computer resource perspective and do not yield a consistent performance. Some techniques to extract a user or object assume, for example, a green background that is easy to be distinguished, though not applicable in applications where the green background is not available.

Once a model of the item or items to be manipulated is obtained, a second problem is to create a smooth rendering flow that will update the model and will render it smoothly back into the original video or into other augmented reality video with the new information. The following disclosed embodiments achieve a smooth rendering flow relatively fast with high quality, so the manipulation can be done in real-time, in semi-real-time, or relatively fast, depending on the requirement of the particular application. Also, the embodiments are adapted to manipulate the items (color, texture, shape) in real time, on camera main stream feed, or off-line on user recorded videos.

Based on the model, the mask, and/or alpha channel per object from a video, user movement is learned and different objects to fit or not to fit with the object shape and form can be installed in a convincing manner. The disclosed embodiments can be distinguished from prior techniques, which attempt to do everything virtually. The embodiments can include manipulation with a mask to cover other changes such as different cloth, the changing face of a user, a change of the user's body type, elimination of a user from an image and the like.

Some embodiments can include multi level user identification. Specifically, the embodiments can include face recognition improvement, user learning, and adaptation. Known methods of face recognition can utilize algorithms that can be very sensitive to face pose. In the present technique, a smooth experience of face pose can be created to accommodate different camera locations and angles.

Various embodiments can include code identification, e.g., quick recognition (QR) code, 1D Code, hidden code and the like. The embodiments can be adapted to discover codes from a relatively long distance with a relatively small image as compared to the image under projection or under other optic distortion. Also, it may include wireless identification, e.g., NFC, WiFi wideband, microwave 3D, body access network (BAN) chip and the like. Wireless identification can be made from a mobile device, watch glass, microchip or any other carry on device or microchip. Other body measurement techniques may include fingerprinting, body identification, body type, eyes, palm recognition, X-ray correlation, body temperature, body pulse, blood pressure and the like.

Another disclosed feature is cloth recognition, which can identify the items and the clothes the user is wearing. For example, it can include a hidden code or information in the fabric.

Other features and embodiments may include: a microwave scanner, where the microwave sensor is integrated in the screen; body measurement features including, e.g., 2D and 3D body line detection or 2D/3D model/mask generation out of a video; analytic conclusion from the measurements, e.g., body type, origin, sex, age, suggested sizes of clothes, suggested diet or treatment and the like; body line tracking over time for diagnosis, identification of changes, user identification, and the like.

Regarding the hardware, various embodiments may include single or multiple cameras from all types of sensors, including but not limited to, CCD, CMOS, IR CMOS and the like, and format protocols including HDMI, Firewire, USB, IP, HDbaseT wireless and the like, and any available resolutions including HD, regular SIF, 4 k, 8 k and the like. The display can include single or multiple screens or virtual screen, and regular screens in all sizes, shapes and proportions. The display can include mirror like screens, smartphones or tablets, projectors, holograms, 3D screens, Google glass, projector head mount display (HMD), glass (with switchable obscure layer) and the like.

In the disclosed embodiments the camera can be located anywhere. A best practice is to provide the camera above the screen facing the user. Additional locations can include the bottom of the screen, the sides of the screen or behind the screen if the screen is a bidirectional screen. In the case of 3D, two cameras can, for example, be provided at the top and side by side, which can provide superior results and ease the computerized method. Also, 3D can be manipulated from a single camera once the user is moving and/or rotating.

The embodiments can include a computerized method to cover a full body or a partial body, and different scaling per user selection (e.g., correction of head and/or eyes, direction of view/point of view and the like).

Each of the above-referenced embodiments can be provided over a still hard copy image 2D/3D. Each of the above-referenced embodiments can be provided over a still digital image 2D/3D. Each of the above-referenced embodiments can be provided over analog/digital video that was recorded by analog/digital camera. Each of the above-referenced embodiments can be provided over analog/digital/optical video stills that were recorded by frame grabber HDMI (or equivalent), IP, USB, Firewire (wired or wireless link) and the like. Each of the above-referenced embodiments can be provided over digital streaming video that can be delivered to a computing device over any suitable communication method such as USB, HDMI, IP cat-5/fiber, WLAN, Firewire, HDbaseT, any combination of the above on a single cable or on multiple cables. Each of the above-referenced embodiments can be provided when the computing device resides in the camera, in the screen, in the cloud, in a computer including a workstation, server and the like.

Each of the above-referenced embodiments can be provided when the computing device is distributed between the system elements, e.g., the computerized method can reside partially in the camera, partially in the video acquisition element, partially in the screen graphic processing unit (GPU), partially in the cloud, partially in the user smartphone device or any suitable combination thereof. Each of the above-referenced embodiments can be provided when the computing device resides in a smartphone, tablet, notebook, screen, camera, HMD, Google glass and the like.

Each of the above-referenced embodiments can be provided when the video is preprocessed to extract a 3D model of a selected item, where the preselecting can be done manually by the user or automatically by applying rules for selection. The model extraction can be performed locally by DSP/CPU next to the camera, in the cloud or in the user application on the user's device. It is more efficient to extract the model in a GPU (graphics processing unit) for a single object or a still image; in this case, a regular CPU can be sufficient.

Each of the above-referenced embodiments can be provided when the rendering is being performed locally in the augmented reality station, in the cloud, or at the user mobile device. The rendering may be performed in the GPU for a single image or a very short video; in these cases, a CPU can provide sufficient performance.

Each of the above-referenced embodiments can be provided when enhanced rendering techniques are performed to improve video quality, e.g., interpolating the object and the image to higher resolution and decimating after combining to smooth the edges and eliminate an aliasing effect. The present invention can eliminate flickering edges, e.g., by smoothing the model frame by frame, by eliminating the allowed changes per frame on the edges, by smoothing edges per frame, by applying averaging filters on single or multiple frames, and the like. Additional improvements can be achieved by increasing the frame rate and applying additional smoothing technique on the added frame to smooth the effect that would occur on the original frame rate.

Each of the above-referenced embodiments can be provided regardless of whether screen resides near the camera. For example, the screen can be located in a control room. A camera main stream or recorded information can be accessed via remote control, via other address directly with physical infrastructure, or over the cloud.

In one embodiment the control on the station functionality can be through a gesture, eye movement, palm movement, finger movement or brain control. The present invention can be controlled with additional accessories like a laser beam pointer, voice control, wireless, or ultrasound tracing.

Provided below are several examples of additional applications that can leverage the technology of the present invention. Specifically, base video transformation can be used to create reliable virtual dressing.

Base video transformation can be used to create a reliable video conference when the user/users on the other side of the line can see the participant as if the participant were looking directly at them, rather than having an image from the viewpoint of the camera. Alternately, transformation can be used to create an image as if a user were looking into the eyes of another user in order to provide a convincing, live experience.

Base video transformation for augmented reality can be provided for multiple purposes including though not limited to: body manipulation and resizing, body measurements, medical diagnostic/monitoring/training and/or tracking, gaming, dressing, dating, meetings, security, full body simulators, dancing training, hair dressing, makeup, general training, traveling, and the like.

Real time and offline appearance registration and comparison can be provided so a user can follow up appearance changes over time and over the years. These processes can be provided for multiple purposes including medical registration, which can be over a given period of time, between multiple examinations, using multiple/different sensors, e.g., for temperature, blood pressure, and the like.

The embodiments can be applied for video conference or gaming where the user would like to change his appearance (e.g., skin complexion, dressing, face, and the like). According to the present invention, the model can allow a smooth change into a desired appearance or even create an image whereby the user disappears from the video.

The embodiments can be used in a security application, with accurate face recognition over calibrated EyesMatch (see, U.S. application Ser. No. 13/843,001) when the camera is located with projection perspective to the user's eyes, with Dynamic QR (quick response) code recognition (e.g., authorization and management of user access via Mobile Application, or badge, QR code can be generated for the mobile application from the cloud and can be verified by user authentication in the application), with full body recognition, scanning, and learning, with item recognition (e.g., clothes, uniform, badge, and the like), with a wireless sniffer (e.g., WiFi, Cellular, ultrasound and the like), with API to a security database, with location systems, with public information and the like. The embodiments can be used with a threat prevention action based on recognition of a specified activity (e.g., lock door, turn on/off a light, release fog, shooting machine, e.g., electrical shock, bullets, paper and the like). Due to the geometry of the calibrated image, the location of the target in the image can be measured very accurately and can be used to operate an accurate attack on a target efficiently without risking others.

In some embodiments, the main camera stream can be manipulated in real time to change the appearance of the user, or to completely make him disappear from the video or image. In this scenario, the camera DSP or separate DSP or GPU capable device needs to get the camera stream and process the camera stream via remote control center and package it again as a camera main stream. A parallel computing to the camera main stream (sniffer) is also an option in one embodiment.

In some embodiments, the calibrated camera/multiple cameras with/without complementary information from other sensors can be used for patient diagnostic and patient monitoring. For example, though not limited, the present invention can be used to monitor and alert for skin problems like skin cancer melanoma, breast changes that can suggest further testing for breast cancer, heart rate and blood pressure measurement, temperature of the patient, halo of the user, skin and finger nail recording monitoring for changes, eye problems, spin, bones, muscles and body flexibility trends and changes.

We now turn to a detailed description and concept block diagrams relating to embodiments of the present invention.

FIG. 1 is a system block diagram for an augmented reality platform supporting a real-time or recorded video/image. The system can include one or a plurality (1:n) of input devices 101 including a video camera, a still camera, an IR camera, a 2D camera or a 3D camera. The input device 101 can be adapted to send information to one or more machine vision augmented reality modules 102, 103, 104, 105, 107, 108 and 109. The one or more machine vision augmented reality modules 102, 103, 104, 105, 107, 108 and 109 can be adapted to send information to one or a plurality (1:m) of screens 106. The one or more machine vision augmented reality modules 102, 103, 104, 105, 107, 108 and 109 can be adapted to send/receive information to/from an interface or user interface module 110. The interface 110 can be adapted to send/receive information to/from one or more of a cloud, a web/store or a user device, e.g., smart phone or tablet.

The one or more machine vision augmented reality modules 102, 103, 104, 105, 107, 108 and 109 can include an image grabbing module 102, an eyes-match transformation module 103, an augmented reality module 104, a video/still recording module 105, a trigger event module 107, a control element module 108, and a factory calibration module 109.

The image grabbing module 102 can include one or more of the following features: enhancement filters, format conversion, video frame separation, image cropping, image resizing, image stitching and the like. The image grabbing module 102 can be adapted to send information to the eyes-match transformation module 103. The image grabbing module 102 can be adapted to send/receive information to/from the trigger event module 107.

The eyes-match transformation module 103 can be adapted to apply on the image the right mapping to match the camera point of view with theoretical mirror point of view (user eyes reflection) and fill the blind pixels if there are any after the mapping. The eyes-match transformation module 103 can be adapted to send information to the augmented reality module 104 and/or the video/still recording module 105. Also, the eyes-match transformation module 103 can be adapted to send/receive information to/from the control element module 108. Further, the eyes-match transformation module 103 can be adapted to send information to the one or plurality of screens 106.

The augmented reality module 104 can be adapted, for example, to provide virtual color and texture replacement, virtual dressing, object insertion and the like. The augmented reality module 104 can be adapted to send/receive information to/from the control element module 108 and/or the video/still recording module 105. Also, the augmented reality module 104 can be adapted to send information to the one or plurality of screens 106.

The video/still recording module 105 can be adapted to record a single image or a short take based on software control. The video/still recording module 105 can be adapted to send/receive information to/from the control element module 108. Also, the video/still recording module 105 can be adapted to send information to the one or plurality of screens 106.

The trigger event module 107 can include one or more of the following features: recognition of a user in front of the mirror, face recognition, recognition of user gesture commands, item recognition, distance measurement, user body measurements/assessments (including, e.g., height, age, weight, ethnic group, sex and the like) and calculation of user theoretical point of view in theoretical mirror. The trigger event module 107 can be adapted to send/receive information to/from the control element module 108.

The control element module 108 can include one or more of the following features: control and management for setting the camera to optimize quality, for setting other hardware elements, an interface between algorithm modules and higher code/application/user interfaces, and push calibrated data from factory into the algorithm elements. The control element module can be adapted to send/receive information to/from the factory calibration module 109.

The factory calibration module 109 can be adapted to define the mapping transformation between the camera and the user point of view in front of the screen. Also, factory calibration module 109 can be adapted to calibrate the image based on distance, a special location, user height or any combination thereof.

FIG. 1 and the following description represents just example of one embodiment of the present invention; other flows or functionalities can be allocated between the modules, represent additional embodiments that are part of the invention. The present inventors propose two methods to enable the augmented reality capabilities (real-time and offline). Both methods wrap the augmented reality module 104 with real image or video data that is real-time or was taken post processing via, e.g., eyes-match transformation module 103.

One feature is that a user can define manually or automatically (via, e.g., interface 110) rules regarding what items the user would like to process and manipulate and what is the expected end result, e.g., an automated rule can be something like a look for a user's shirt, which can be changed to a different color, or a user selecting a shirt via manual selection with a touch screen and manual color selection. Then, the selected object can be processed and extracted/segmented out and recorded to the database linked to the original recorded video or image. The augmented reality module 104 can then process the model/mask in real-time at a given frame rate, which can be at a lower or higher frame rate than the original and at the same or a different size than the original. Some applications do not require (but can nonetheless include) live augmented reality, like trying-on clothes when the user would like to see himself with the modification (one or more options). Once the extracted object from the live scene is saved, it is easier to render multiple changes (color, texture, size, and the like). In addition, it is easier to perform a longer process, much more accurately, with higher quality and utilizing a process that yields more information, e.g., user movement, body measurements, and quality based on frame integration and the like. For other applications that require real-time processes, like a video conference, the second option is better to use. With the second option, the performance should be adapted to be as close as possible to the actual frame rate of the camera in order to avoid introduction of delay/lagging that can yield frame drops and poor performances. If delays/lagging are encountered, then such delays/lagging can be managed in a way that yields a smooth video without lagging of the frames. Such management can be achieved with buffers, image timestamps plus some delay, or with timestamps and frame reschedules for rendering.

For video input, it is highly recommended that the rendering process be done in a DSP or GPU device in order to avoid introduction of delay into the video. The creation of the mask/model can be done for the first option (not real-time) in a CPU as well. For the second option, the mask/model can be performed and calculated in the GPU/DSP as well.

In the trigger event module 107, some of the trigger functionality can be completely automated, e.g., a process can be started if face detection or presence detection is made. Some of the triggers can be performed in a semi-automated fashion from the user interface module 110, which can include any way to control the computerized device. Some of the functionality of the trigger event is to calculate the image transformation based on geometric information, calibration, and/or real-time user tracking, e.g., location of the user, eyes, head, hands, position, movement and the like. The tracking can be done using one or more techniques such as background substation, pattern recognition, color segmentation, and the like. The transformation tracking calculation functionality can also be implemented in the other modules.

The control element module 108 can be adapted to configure the system setup, camera device authentication and the like, can also provide information from the tracking transformation function into actual geometry transformation module or augmented reality module and the like.

With the factory calibration module 109, some of the information needed to calculate the transformation to be applied on the image/video can be generated during factory calibration or can be calculated based on additional information on the actual orientation of the camera in the field, e.g., height above the floor or desk and the like, 3D point of view, lens field of view (FOV), and the like. The factory information plus the actual geometry of the implementation can be processed and delivered to the right element in the system that will use the information for better calibration and accuracy.

In addition to application to a local screen for a mirror application, the present invention can be used to send the video plus the means to transform it or the actual manipulated and transformed video to another address in the cloud or locally as a single or bidirectional video conference.

Figure 2:
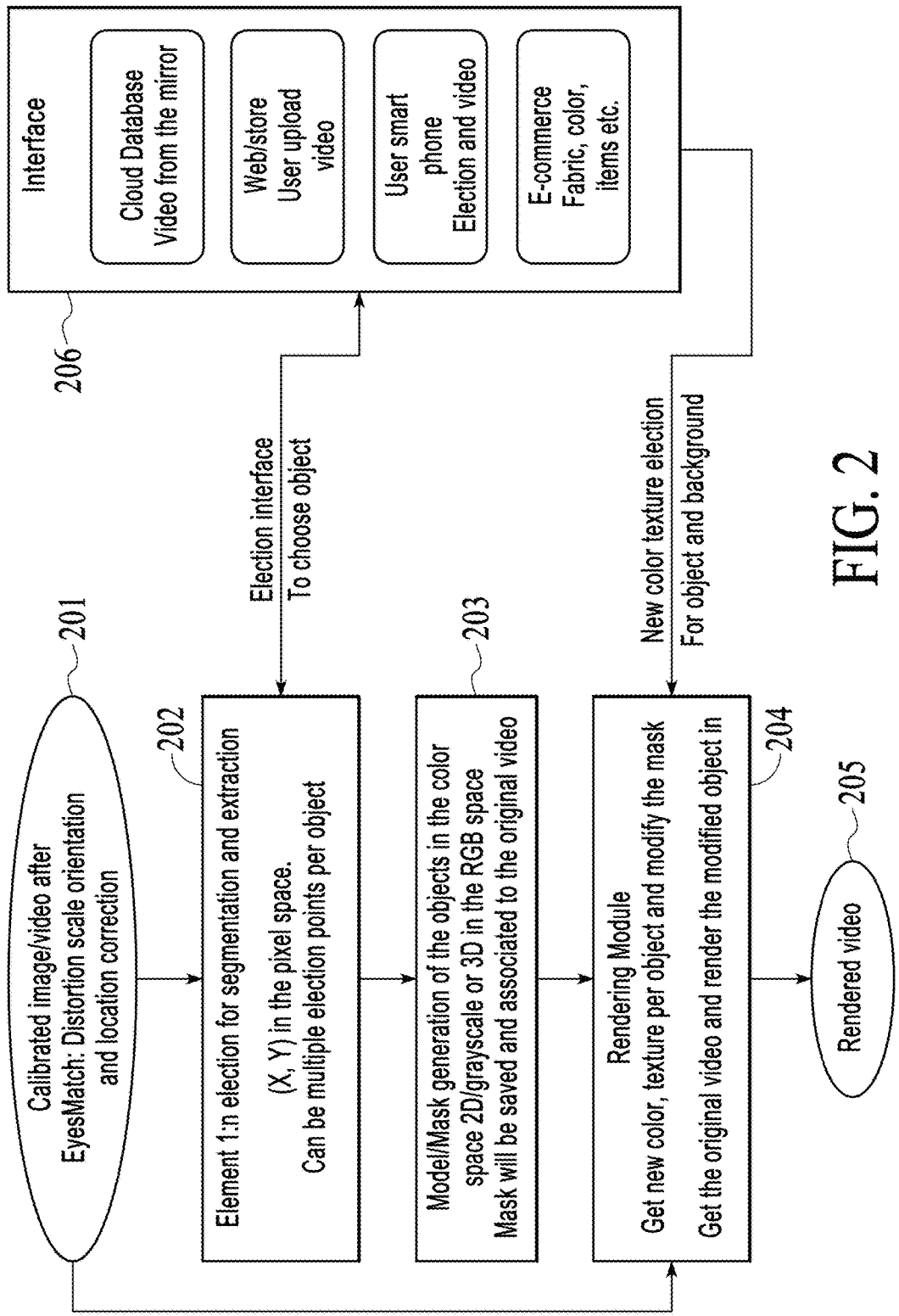
FIG. 2 illustrates an example of an augmented reality module, which can correspond with the augmented reality module described herein.

FIG. 2 depicts an example of an augmented reality module, which can correspond with the augmented reality module 104 described above. Specifically, the augmented reality module can have a function of allowing a user to virtually dress themselves. In this embodiment, the system obtains input image or video from, for example, the EyesMatch computerized method 201 or from any other image/video source, e.g., user smartphone, security camera, Google glass, mobile camera or stationary camera. Additional embodiments can include additional geometric information that will help to calculate proportion like user height, gaze and the like. If the user video or image is coming from the EyesMatch module (calibrated image/video), a more comprehensive model can be created that allows for body measurements, object pose, size, highly accurate orientation detection and the like. The additional information that can be calculated from the calibrated object or video can allow for object fitting, object replacement and insertion of new objects into the frame/video.

The election module 202 can obtain election information from interface 206 manually from the user (X,Y or name of object) or automatically from an electing method, e.g., a mechanism that can automatically detect predefined objects like pants, dress shirts and the like.

The module 203 can obtain the location and samples the color (or the average color of the object, which can be more than one color). The module 203 can use this information to create a black and white mask that is first used to generate a 2D or 3D textured shaded and colored mask.

The technique to extract the module is based on 3D color correlation or any other technique such as the closest Euclidian distance between the object average color and the pixel color to separate the pixels of the object from the entire image.

The decision as to whether the pixel is in the object or not can be performed in multiple levels and is not limited to the following examples:

1. Color correlation and the first decision can be based on Euclidian distance threshold, where the Euclidean distance threshold is in the RGB color space or chromatic color space.

2. Filter noise by applying morphological operators like dilution and erosion, which can improve the decision regarding pixels that are "wrongly labeled" as part or are not part of the object.

3. Decision based on information from previous or forward frames, or from neighboring pixels in a row or around the pixel. This step represents a major decision in the process.

4. Object distance from original election, which can be used as a threshold.

5. Object surface continuation, whereby, if we know that an object surface continues, then we can filter out some of the noise.

6. Object edges, whereby we can improve the decision around edges by edge detection that can be done by high pass (HP) filters or other techniques.

7. Decision based on color energy. One of the problems of color separation is that color under low light conditions can be seen as black, and the dynamic range of the decision is reduced significantly. Dark/black pixels can be isolated and other techniques can be applied to decide if the dark/black pixels belong to the object or not, e.g., the present invention can determine if the pixel is located inside the object boundary, or the distance of the energy from the object STD color changes.

8. Use previous information on the expected object shape to obtain better results.

9. In case the object is a combination of multiple colors or shapes or has logos or other pictures, multiple color correlation and combining can be used. Additionally, any of the multilevel methods specified above can be used to obtain a higher level decision regarding the object.

10. The decision can also be based on a majority or a decision pertaining to a neighboring pixel/image as a weighted factor in the decision. In case we are processing the decision on the image as a vector, it can be easier to look at the neighbors in the same row or same column depending on how the image matrix is reshaped into a vector.

11. Estimation of the item material/texture color STD can also add significant information for object segmentation.

12. Any combination of one or more of steps 1-11 above.

The mask can be used for rendering as a simple black and white mask. However, in order to create a convincing feeling of an object, additional information from the object's texture or appearance can be maintained. In order to obtain the additional important information, the mask can be applied on the original frame or video, and the RGB or gray scale texture shade or brightness scale on the object can be obtained. This information is much more accurate and convincing for color changes since it saves the original object's wrinkle texture, shading, light reflection, material signature and the like.

The model mask can be constructed in layers for improved manipulation. Examples of a potential layer structure can be as follows:

1. Black and white mask (to segment out the object). The black and white mask can be very important to distinguish between the object and the background or between the object and another element around the object. Multiple techniques can be used to optimize the object mask/boundaries decision.

2. Object edge mask—representing the edge or outline of the object.

3. Red color mask—representing red areas of the object.

4. Green color mask—representing green areas of the object.

5. Blue color mask—representing blue areas of the object.

6. Textures that apply to all color masks—representing texture appearance of the object.

7. Shade or brightness mask—representing shaded or bright areas of the object.

8. Material light reflection mask—representing light reflection of the object.

9. Material light absorption mask—representing light absorbing areas of the object.

10. Mask from other sensors like IR, microwave, depth, ultrasound, ultra band and the like.

11. Layers similar to those described above.

Once the mask model has the required information, in order to change color or texture, the rendering module 204 can be used to modify the specific layer/layers and regenerate the object out of the multiple layers resulting in a rendered video 205 that is extremely realistic. For example, if the user wore a red shirt, the red mask can be replaced with a blue mask to render the user wearing a blue shirt. Since all other masks remain the same, the blue shirt will be rendered with all of the shading, brightness, reflection, texture, etc., of the red shirt, thus rendering a very realistic blue shirt having the same folds and following the same body contours as the red shier. The effect of some layers can be introduced by multiplication or by adding the modified layer to the frame. Subtraction and division can also define relationships between layers. Additional techniques that allow for more complex item manipulation include a registration technique, which can based on a few points stretch/transform an object or material to fit within the boundaries of the manipulated object.

The module can obtain the original video/image, the modeled mask multichannel and the required change. The required change can be any combination of color, brightness, material, texture, icon/logo, printing, fabric and the like.

In one embodiment, the required change can be outside or inside the original object boundaries and a modified mask for the new object boundaries can be created to replace the original mask model.

In one embodiment, the required change is fabric with specific oriented texture and color that can be inserted in a specific orientation. In this embodiment, the material orientation can be modified and applied accordingly.

In one embodiment, the required change can be another user's try-on mask. Using a registration technique, the other user's try-on mask can be applied to fit the new object on the user's similar object to try-on. For example, a user is measured for a shirt and another user is measured for a jacket in order to show the first user how the jacket from the second user looks. The method can use a registration technique that fits the second user's jacket so as to obtain and apply the correct body line shape of the first user, which can create a more convincing fitting. One benefit of this method is that the jacket will look much more real in that it is rendered so as to preserve all the texture of the second user. To produce these results, the method can register the orientation, location and size of the first user.

In one embodiment, the mask can be used as pointers for virtual object registration. In one embodiment, the mask plus the background recording in the right transformation as the user can be used to eliminate the user/item from the image/video.

In one embodiment, election of the single object or multiple (1:n) objects can be obtained that need to be modeled. From the video, a mask is created per frame. If the user is spinning, a 3D or partially 3D frame by frame model can be created. From this frame by frame model, different perspectives can be obtained and used to create a 3D model that includes some or all of the user's movements. Later on, this information can be used to create a more convincing virtual dressing. That is, the present method can utilize the user's own movements in forming the model.

In one embodiment, the rendering can be performed in the GPU, CPU, cloud GPU or cloud CPU. The input elements to be rendered can come from the CPU, from the user database in the cloud, or from an active link with the inventory/any other database/3D printing, ecommerce data base, social data base and the like.

Changes in item color can be based on actual try-on and available inventory or optional 3D printing on site or in the factory for user customization. One advantage relative to regular virtual dressing is that the item is shown draped on the body just as it would in reality, since all of the folds, shading, etc., will be transferred with the appropriate masks. This is a very important feature from many aspects. The user can sense how the item feels on his body, how it may effect and change his body shape and the like.

In one embodiment, an accessory or any other item can be added by learning the dynamic movement and the mask model of the relevant object. Also, the background can be augmented so as to change or create a different environment by the same technique. Once all the required objects are labeled, the required objects can be masked and the combined mask can be used to change the background.

In one embodiment, the rendering module can render the object with an enhanced rendering technique of interpolating the object and the frame into higher resolution, can combine the object at high resolution, can smooth the edges, and can decimate the object back to the required resolution with better quality of integration into the frame. Additional techniques include working directly on the edge of the object by averaging with some weighting factor the value of the pixel in order to better blend the object with the background color.

Figure 3:
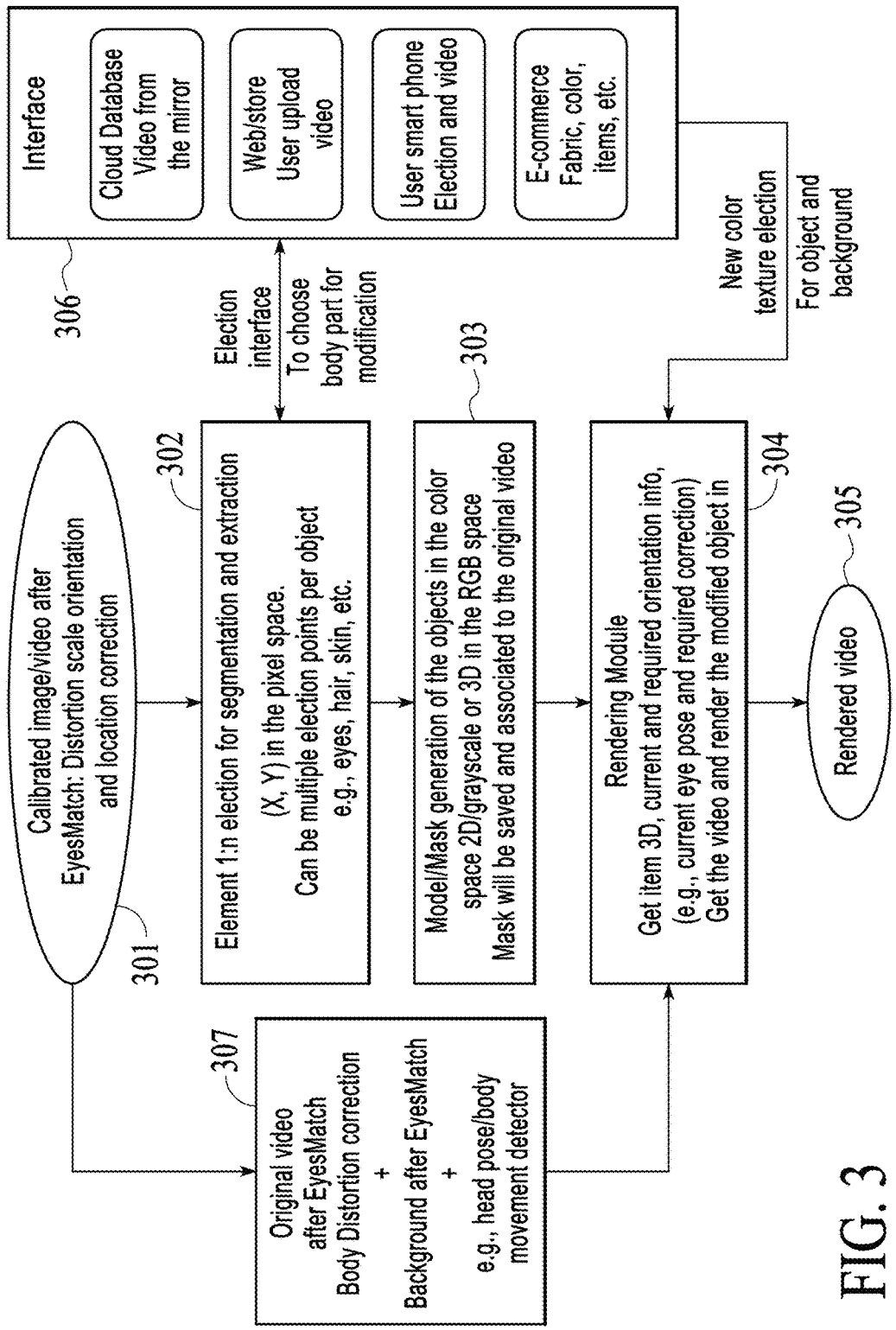

FIG. 3 depicts an augmented reality module that can replace a body part, color, orientation and texture of an item or object in the foreground or background of the image, e.g., the module can add hair to the user, change the user's eyes, skin and hair color, can change the pose of the eyes and the like.

Modules 301, 302, 303 and 306 can work in a similar manner as compared to modules 201, 202, 203 and 206 of the previously described general augmented reality module. Module 304 can have the capability of calculating or obtaining additional information like head pose or body direction of movement directly from the EyesMatch module or from module 307 utilizing a dedicated detector for item 3D movement and orientation and can use this information to modify the required body part, e.g., obtaining the head pose will allow for eyes steering correction by modifying the eyes of the mask/model to the required direction. In addition, the head detection can allow for adding hair in the right orientation, a hat and the like.

In one embodiment where the required mask in some dimensions is smaller than the original mask, module 307 can perform or deliver in real-time or offline EyesMatch transformation of the recorded background image or video. The background transformed image or video can be capable of rendering a part of the body part or item using foreground or background manipulation, e.g., in case one would like to eliminate a user's head or upper body from the video. The transformed background image or video can be applied on the mask that captures the head and upper body, and the result can be rendered with the original transformed or non-transformed video. The result can be a rendered video 305 without the user head and upper body.

For example, in a more complex case, one might wish to depict a shorter length of a given dress. The mask manipulation in module 304 can be required to create a shorter mask for the new dress, and the difference between the original mask and the mask after manipulation can be a new mask for manipulation. In the new mask, some part will be the estimation of the user's legs and some part will represent background that would be newly visible with the shorter dress length. The new mask can be divided to legs and background, and the new rendered object can take the combination of background image and predicted leg to create a new rendered item. The result after rendering the modified item into the video is a user with shorter dress. Multiple techniques can be used to predict how the legs should look in the useable area.

Figure 4:
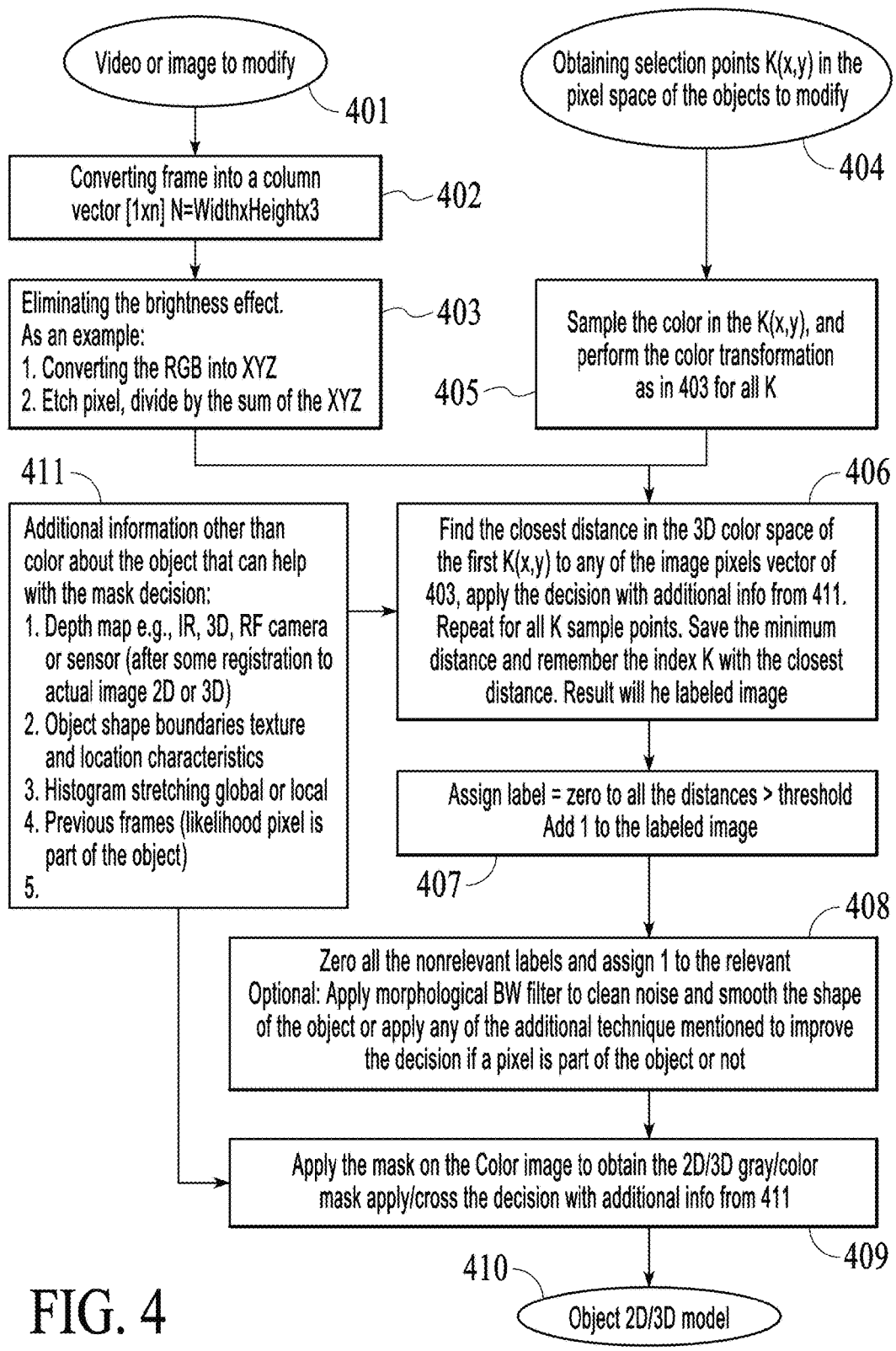
FIG. 4 illustrates computing methods to create a model for color and texture exchange, which can be referred to as a Colograma.

FIG. 4 depicts computing methods to create a model for color and texture exchange, which can be referred to as a Colograma. This technique is focused on parallel computing that can support a large number of users or a large number of frames/video as opposed to super high quality color exchange techniques that can be found in software programs such as Photoshop. Such methods can take a lot of time and may not be practical to conduct on any large number of user images or video. The description of FIG. 4 is just an example and any derivative of the depicted flow is part of the present invention.

One challenge to change a color of an object in a video or image is to accurately identify the relevant pixels of the object. In a video file, speed is a limiting factor for applicable transformation. In FIG. 4, a simplified example of a method to segment/extract an object from a video is depicted.

The image or video to be modified is received in 401. In 402, the frame of the color image or video is converted into a line vector, which is optional, though vectorization of the image can speed the process time dramatically. Also, in 403, the effect of the brightness is eliminated. There are many techniques to eliminate the effect of the brightness. In this example, energy averaging per pixel in the XYZ chromatic space is used, by dividing each pixel by the sum of XYZ. For example, a 3×3 matrix can be used to convert RGB to XYZ, using the chromaticity coordinates of an RGB system ($x_r$, $y_r$), ($x_g$, $y_g$) and ($x_b$, $y_b$) and its reference white ($X_W$, $Y_W$, $Z_W$). In parallel, at 404 the object selection is performed by selecting all points K(x,y) belonging to the object to be transformed. K is the number of objects/zones with distinguished color that can be segmented out of the background or out of other objects. Then at 405 each point is passed through the same transformation as performed in module 403. At 406, k iterations are performed to find each pixel and to find the closest color. K>/=2 in this technique. For each k, the Euclidian distance 2D or 3D is calculated. The minimum distance and K value is saved. This operation can be done on all pixels at once in a relatively fast process.

$$\text{dist}=\text{sqrt}((X-xi(k))\hat{\ }2+(Y-yi(k))\hat{\ }2+(Z-zi(k))\hat{\ }2)$$

After K iterations, the labeled image can be obtained. The Euclidian distance "dist" is just an example of a computational method to distinguish between colors; there are other methods to calculate the distance between colors, e.g., a color distance model based on human perception of color (chromatic, saturation and brightness), advanced calibrated techniques to match the sensitivity and the ability to separate color with the human eye like in CIE76, CIE94, CIEDE2000 and the like or any combination with histogram stretching IR/3D depth camera, color integration over time or any other method to improve sensitivity of the color detection (module

411). Applying or crossing the additional information from module 411 can happen at the distance comparison level 406, at the very end of the model creation 409, or any combination depending on the nature of the additional information (deterministic, statistic, time variant, and the like).

In addition to color difference we can also use other techniques that can add information about the object to improve the decision such as: zone likelihood (a given pixel needs to have neighbors or some mass of pixels), zone characteristic, boundary filters to isolate the object boundary before making a final decision, depth information (which typically needs to match the contour of the depth information with the end image of the object in 2D or 3D), time integration to determine if pixel is in the object zone over multiple frames, and the like.

Module 407 is an example of one embodiment of how to distinguish between the required colors and the other color space. In module 407, all the pixels with a distance greater than a threshold are zeroed out as non relevant (a pixel with a color different from any one of the colors 1 to k), and 1 is assigned to all relevant pixels, thereby generating a binary mask. In 408 a black and white filter can be used to clean noise and smooth out the shape of the object. Other techniques may be used to improve the decision of which pixels belong to the object. As a result, an index for all the relevant colors starts at 2 to K+1.

Module 407 is an example where it is desired to separate a specific color or colors. Here, all the indexes can be zeroed out except the required one. The process proceeds as follows: zero out all the non-relevant indexes, obtain a background and non-relevant colors value=0, and elect the required color object labeled=1. If there is more than one color in the object, 1 can be assigned to any elected index 2 to k+1 and zero to all the others.

At module 409, the obtained black and white mask is applied on the original color image and the 3D model for color and texture changes is obtained. The model can be 2D alpha channel of gray scale or 3D in the color space. Module 410 can obtain a 2D or 3D model of the object. In case of video from a single camera, it is possible to obtain a 3D model even if the user is moving in front of the camera, e.g., turning around in front of the camera. In this case, it is also possible to obtain object measurement in multiple cuts to estimate the user's 3D body curves.

Figure 9:
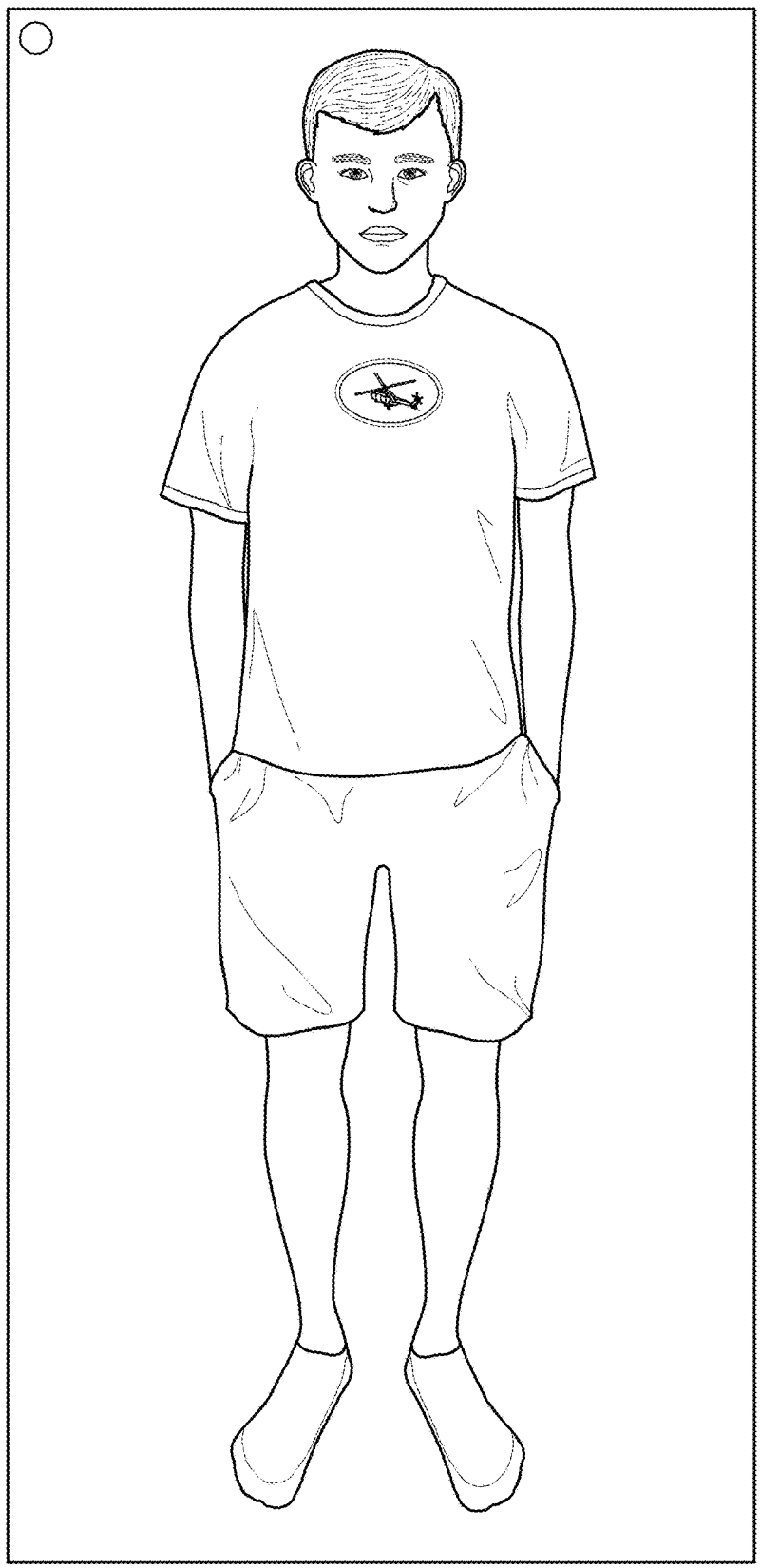
FIG. 9 is directed to an example of a 2D input to a model generator, where it is desired to create a model of the user's shirt.
Figure 10:
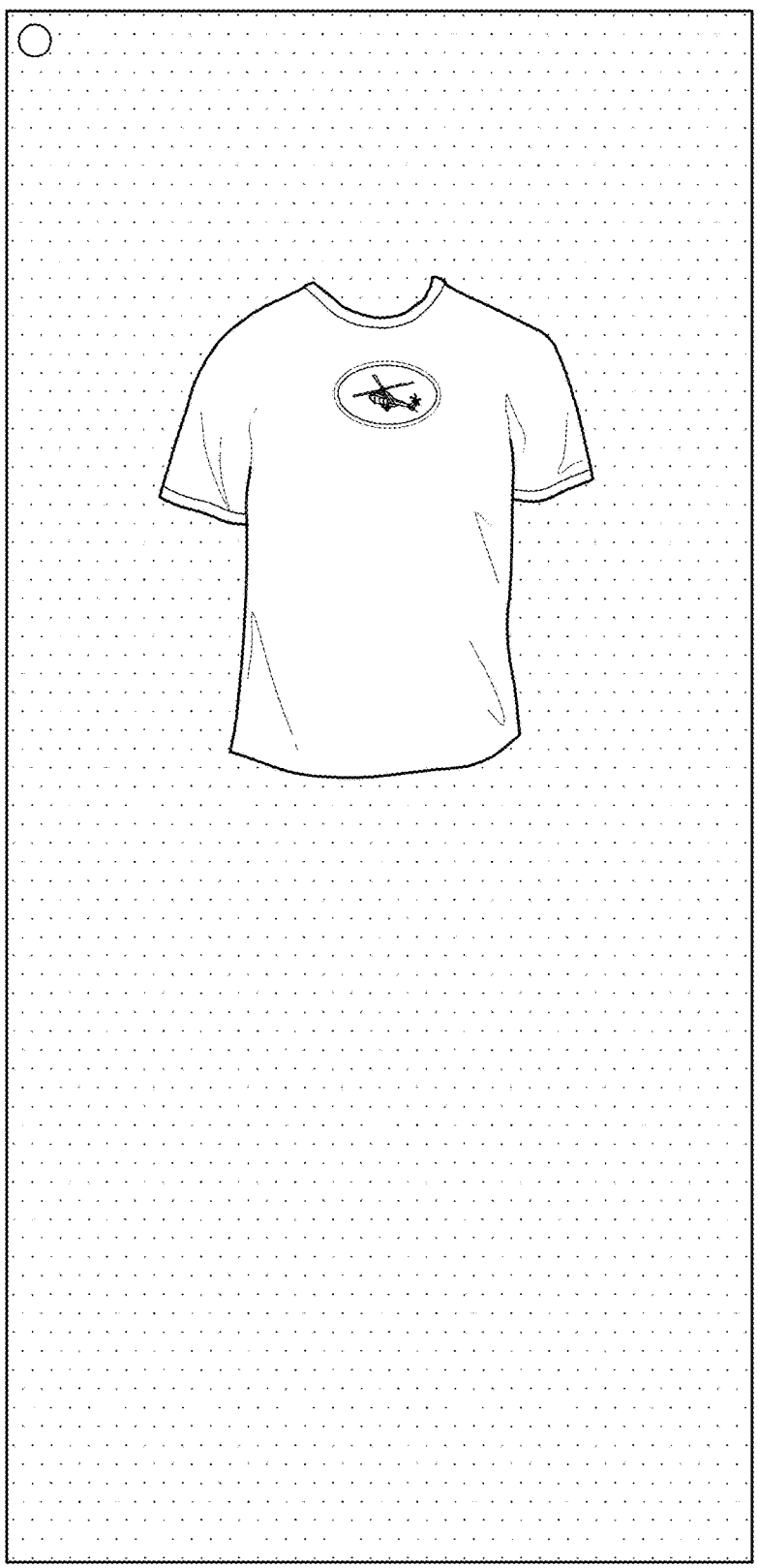
FIG. 10 is an example of a 2D model of the upper shirt.

An example of a 2D input to the model generator is provided below, where it is desired to create a model of the user's shirt shown in FIG. 9. FIG. 10 is an example of a 2D model of the upper shirt. The texture of the shirt is preserved in this manner, so it is relatively easy to manipulate the color or the texture or even change the boundary of the model to create a different object.

The model based on just color difference is not perfect in terms of quality hence additional information and techniques can be used to improve the quality of the object model (see, module 411). Additional information techniques like interpolation and decimation or edge smoothing can be apply after processing via module 410 in order to improve the quality of the model.

Figure 5:
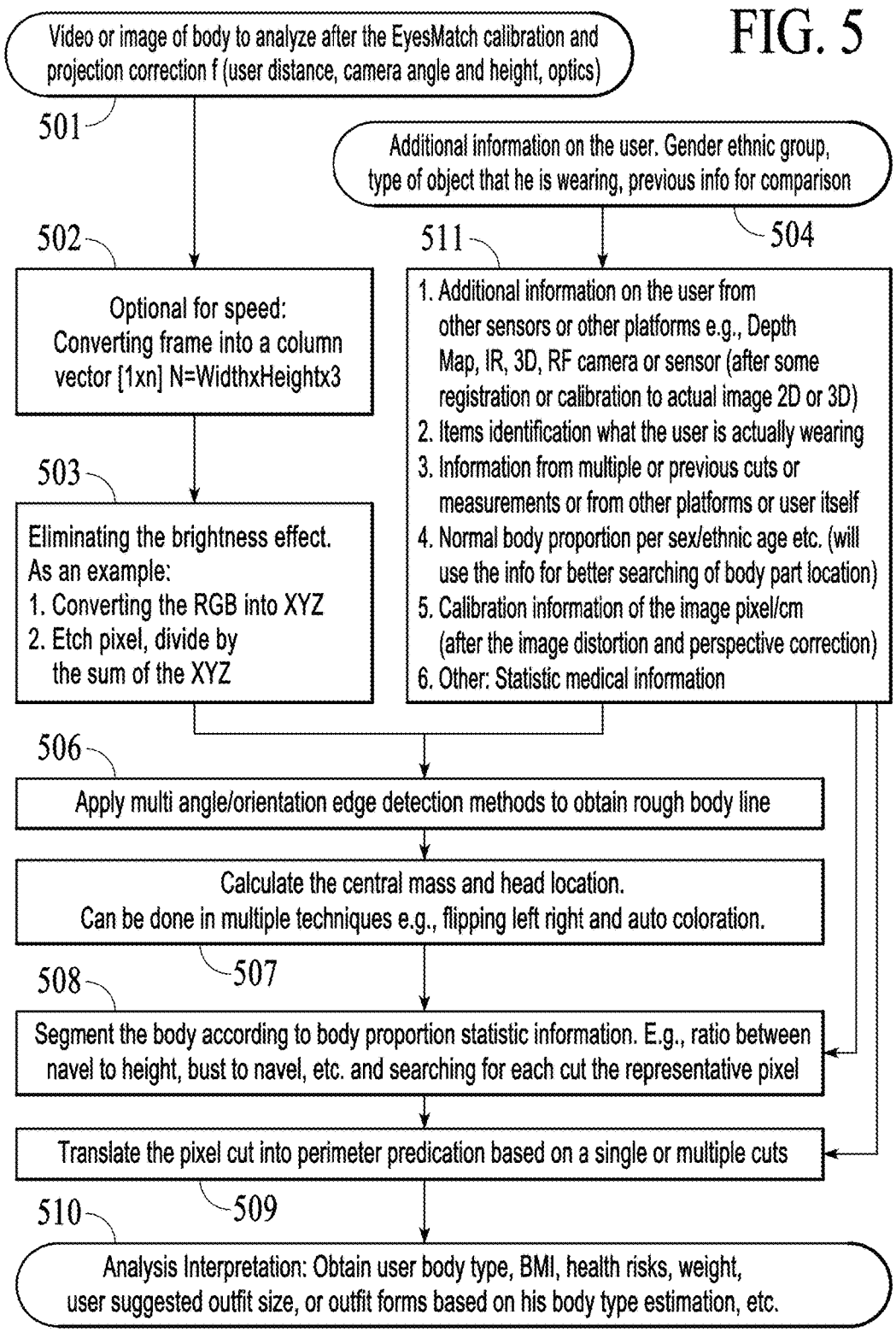
FIG. 5 depicts computing methods to create a model for color and texture exchange, which can be referred to as a Colograma.

FIG. 5 depicts computing methods to create a model for color and texture exchange, which can be referred to as a Cologroma.

In module 501, the image is analyzed using a body line and Body Mass Indicator (BMI) analysis by first using a process similar to the EyesMatch approach described in U.S. application Ser. No. 13/843,001. In this approach, the image can be rearranged to compensate for distortion due to the setup geometry of the camera and optic distortion. Example of setup distortion factors include the user distance to the camera, the camera height, camera projection angle, the optics of the camera's FOV and other optic distortions. After the image correction, each pixel area representation can be roughly uniform in cm^2. Processing can be done in CPU, GPU, DSP in the camera, local computer near the camera, or remote server.

Module 502 is an optional element, which can transform a 2D image to vector conversion, which can speed up processing. The size of the vector is the width, times the height, time three pixels (for RGB). The image inputted into module 501 can also be a vector already. It can be easier to perform some types of image processing on 2D matrix while other types of image processing are better suited for the vector image.

In module 503, it can be easier to perform the color manipulation to eliminate light and saturation effect on the vector image. This is done in a similar manner to what is described with respect to 403 above.

In module 506, the image can be made to pass an edge detection filter that can emphasize color changes and enhance the visibility of the body line. The edge detection can support edges of the body line so it can support multiple edge directions. For example, an edge filter with vertical, horizontal and +/−45° capabilities can yield a good edge detection of the body line.

Modules 504 and 505 can provide additional information into the algorithm that can help with the image analysis, e.g., sex, age, race and the like of the user and statistical proportions associated with the information. This information can be used later on to focus the search of body parts. The height measurement can be used with complementary body proportion information to focus the search of specific body parts, for example, the bust, navel, waist, hips and the like.

Module 507 can provide head detection. There are multiple techniques for head detection. For example, one can take the edge emphasized image, flip it along the body length, and perform correlation between the images. The peak of the correlation can indicate the central mass of the body. Another alternative method is centroid center mass calculation of only the edges. Centroid center mass calculation can be less accurate if the light on the user is not uniform enough; however, this technique can be faster. Other techniques can be based on pattern recognition, eye, nose, and shape detection of the head. Once the central mass is found, a relevant window can be cropped to identify the body from the image. Also, the emphasized edge of the tip of head can yield the height of the user in pixels. Since the image has a uniform weight of length per pixel, the total height can be calculated accordingly. The assumption is that the module 501 transformation will yield consistent manipulated images across arrangements, e.g., 1-5 meters (m), where the actual height of the user on the screen in pixels will be proportional to the actual user height. Additional factors can be added if this assumption is not exactly the case per all distances.

Figure 13:
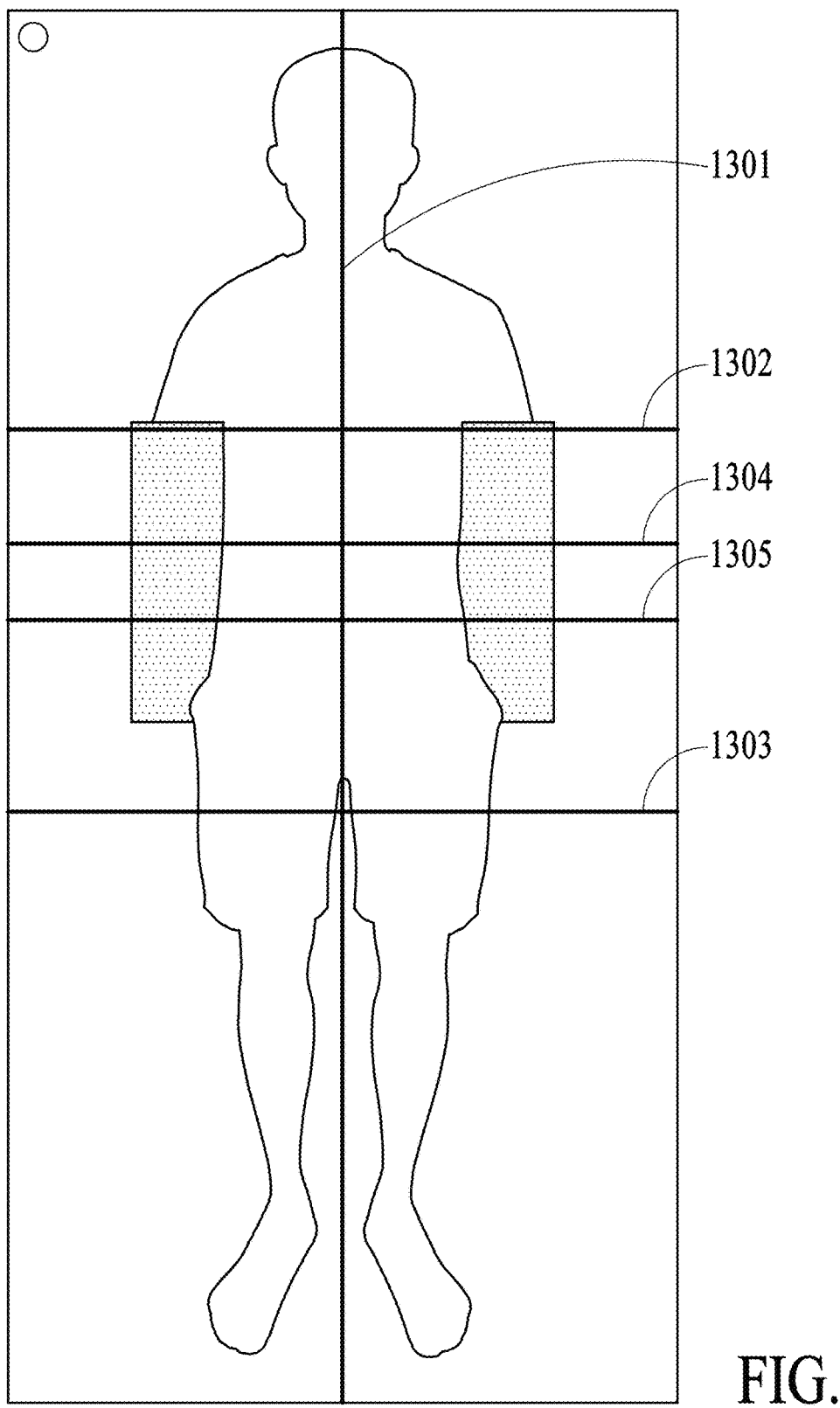
FIG. 13 depicts an example of the result of additional processes that eliminate the hand from the body and point to different intervals of where to look for particular body measurements.

Module 508 can measure the size of body parts in pixels. The technique can be an additional process on a focus area to further emphasize the body part. FIG. 13 depicts an example of the result of additional processes that eliminate the hand from the body and point to different intervals of where to look for particular body measurements.

Measurements in pixels can be translated into centimeters (cm) according to the predicted curve, e.g., the neck can be modeled as a cylinder so the measured width of the neck in pixels can represent the 2× radials in pixels, then the radials in pixels can be converted into cm per the calibration. The bust for a man has a more elliptical model, so the translation will be a bit different. If additional side measurements are available, such measurements can be added to provide more accurate information to the model.

Figure 11:
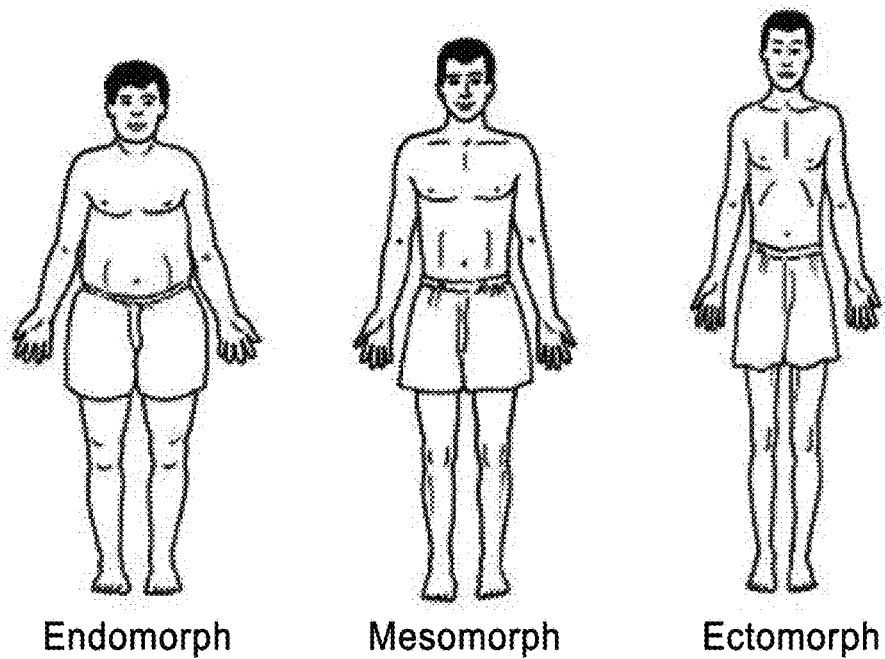
FIG. 11 is a schematic illustrating classification of male body types.
Figure 12:
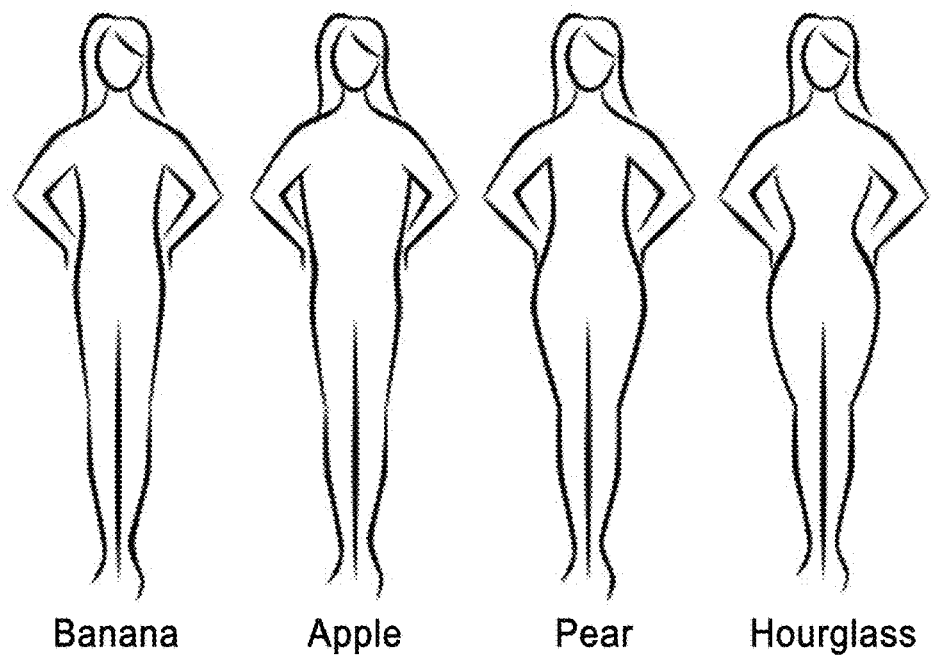
FIG. 12 is a schematic illustrating classification of female body types.

In module 510, the measurement can be deduced from the body type of the user, e.g., a "pear" shape if the hips are wider than the bust and waist (see, FIGS. 11 and 12). In addition, some analysis can suggest the following:

1. body condition health risk for heart issue and the like;
2. the type of clothing that best fits the user's body type;
3. trends in the user's body for historical comparison;
4. focused advertising based on the user's body type (e.g., Mesomorph/Endomorph can get focused coupons for the best nutrition that fits their body type);
5. body recognition; and
6. body diagnosis can monitor body changes over time (spin condition, flexibility, potential tumors, and the like).

Information on the user's BMI can be learned or estimated from the object model described in FIG. 4 or directly from the image BMI analysis as described in FIG. 5.

Figure 6:
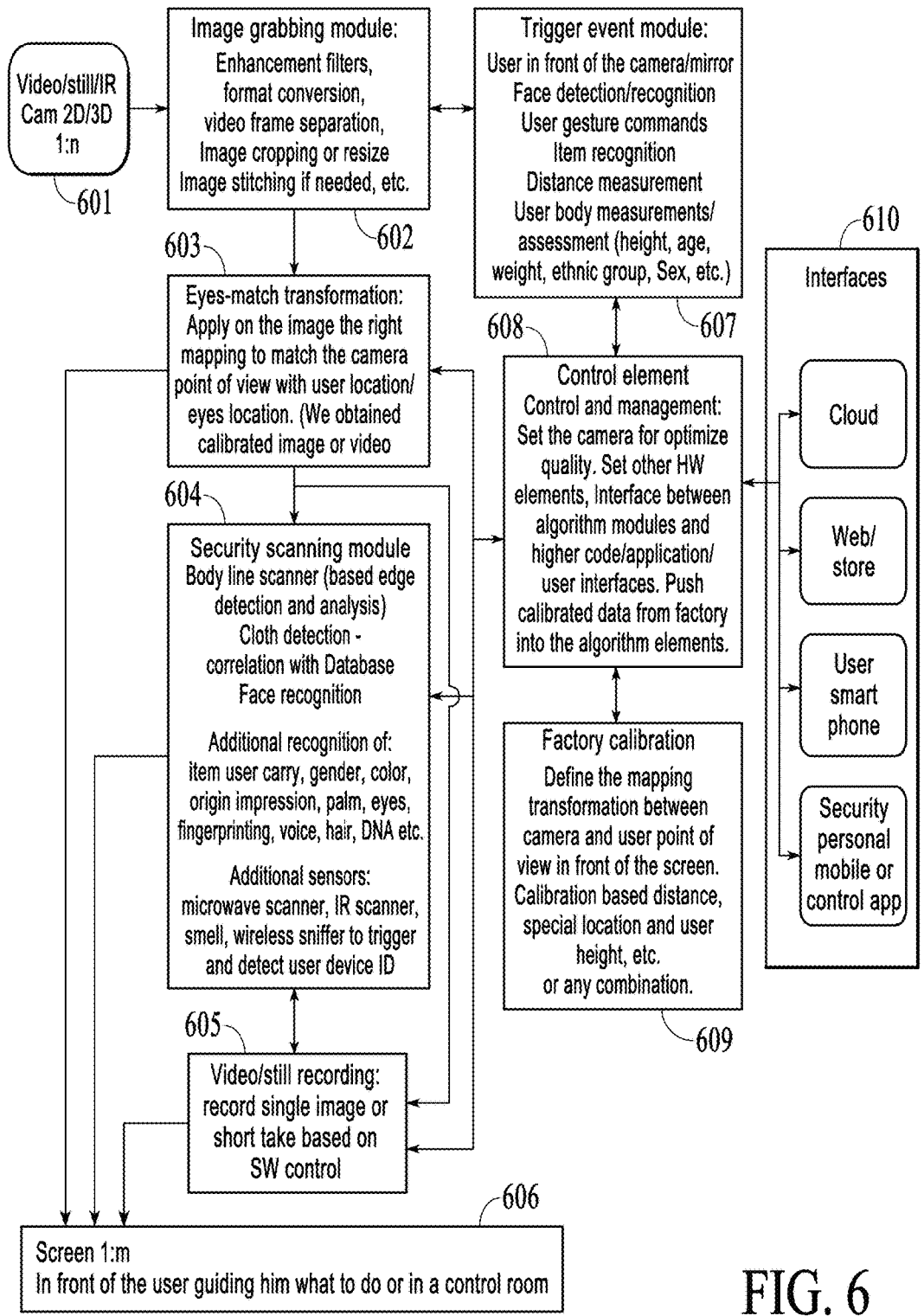
FIG. 6 is an example of a security system application for multilevel user learning and authentication.

FIG. 6 is an example of a security system application for multilevel user learning and authentication. This is just one example of possible flow implementation; any combination of the flow or different functional separation between the diagram modules is part of the invention.

As in the previous figures, stills or video from device 601 can be input into an image grabbing module 602. The image grabbing module 602 can be controlled by a trigger event such as those previously described and processed by trigger event module 607, which can provide tracking information and rules to initiate an image grabbing process. Specifically, the image grabbing module 602 can grab the image from the input 601 and push it into the EyesMatch transformation module 603 with the additional tracking information (real time geometric measurement). Based on the tracking information and the event requirement, the EyesMatch transformation module 603 can calculate a transformation to manipulate with the camera point of view, angle of view, and the like to create a calibrated image of the scene. In addition, the EyesMatch transformation can be performed locally in GPU/CPU/DSP, in the cloud and the like. In one embodiment, advanced information on the user or on the geometric structure of the scene can feed the tracking algorithm and may take part in the calibration. The additional information can be provided as one time geometric information, e.g., user height, distance between his eyes and the like. In that case the additional geometric information can be used to calculate the required transformation. The difference between the distorted image and the known geometric can be used to calculate and calibrate the transformation.

The calibrated output from the EyesMatch transformation module 603 can then be faded into the security scanner module 604, which can also be called a scene analytic module. The security scanner module 604 can be adapted to learn one or more of the following: body line or body curve scanning based on multiple techniques, e.g., edge detection, statistical edge detection, IR camera, microwave sensor, 3D camera, single camera and multiple cuts when a user is turning around. A complete 3D model of the body can also be taken when the user is turning in front of the video camera and the user's clothes can be extracted to an alpha channel as described in the technique depicted in FIG. 4, i.e., Colograma, and the like.

Other learning or authentication methods include, for example, cloth detection, whereby a signature to an item is created and sorted in a database. The database can be updated from the internet, by scanning clothes from multiple databases and ecommerce stores or by actively scanning and updating information by the operator, for example, a uniform of security personnel, the type of fabric and the like can be entered.

Also, the combination of EyesMatch with face recognition can allow the operator to install a camera above a user's height, for example, above a door facing down about 30-45 degrees; such installation allows the user to move freely below the camera. In this scenario, for example, the detectable face recognition range is about 1-5 meters in front of the camera. This is an advantage since known face recognition systems are not very accurate if the user's head is scanned at an angle of +/−15 degrees.

Additional body authentication sensors can include voice, smell, palm, fingerprint, eyes, DNA, skeleton with X-ray sensors or ultrasound, teeth, hair, impression, color, eyes, blood, halo, temperature, skin marks, ears and the like.

The video, stills or the analyzed data can be recorded with a video/still recording module 605 directly from the camera, from the EyesMatch transformation module 604, from the processed image or from data out of the sensors.

The visual video/image or analyzed data can be displayed in front of the user screen (full body or smaller), delivered over the cloud or delivered directly to a control center to be displayed on a screen 606 or to a module for further processing and analysis.

Modules 607, 608, 609 and 610 are similar to modules 107, 108, 109 and 110, respectively (see, FIG. 1 and associated descriptions thereof).

Figure 7:
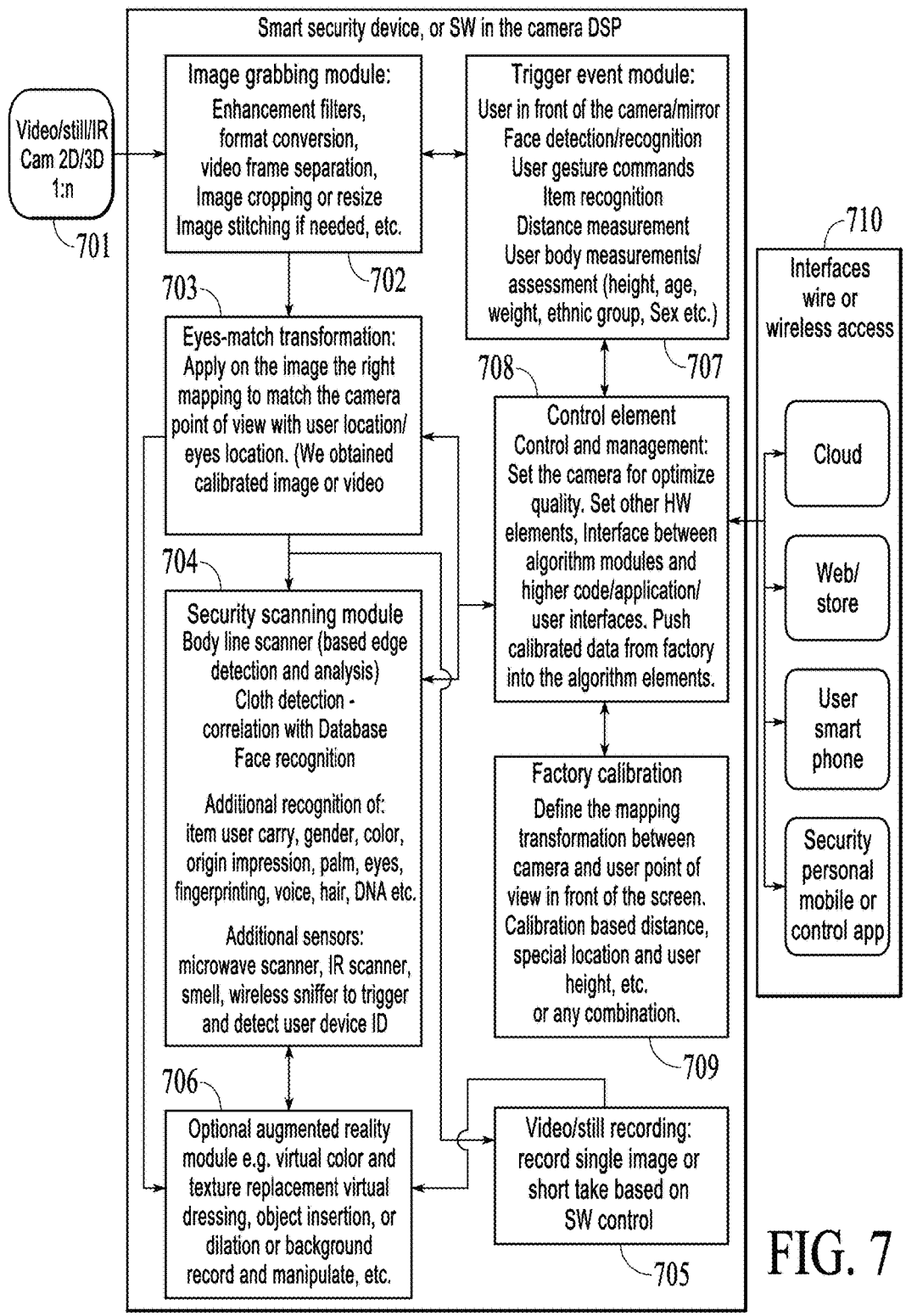
FIG. 7 depicts an example of a security system application for parallel or in-band camera manipulation.

FIG. 7 depicts an example of a security system application for parallel or in-band camera manipulation.

The capability of the device in FIG. 7 can reside in a stand-alone device as depicted in FIG. 7 or as part of the camera DSP capability; the control of the feature activation can be done wirelessly or via wired infrastructure. In addition, some of the capability can be supported in a remote location, e.g., measurement and tracking. In addition, the device can be deployed in front of the camera and can project a manipulated image on a small screen to the camera.

The camera main stream can feed the device or the device can be adapted for taping and sniffing the camera main stream. After processing, the device can be adapted to send parallel data to the operator.

The device can have multiple image computing capability, EyesMatch geometric capability, e.g., in the EyesMatch transformation module 703, body measurement and user authentication, e.g., in the security scanning module 704, and augmented reality capabilities, e.g., in the augmented reality module 706, where the image can be manipulated on the main stream or in parallel to the main stream, e.g., manipulations can include a change of a user's body type, color, items held by the user, hair style, complete user disappearance and the like. These capabilities are very important for security usage.

In addition, the video stream can feed another device like a robot, a head mounted display, a user application and the like.

The interface to control the device functionality can be over the wire or wireless infrastructure or to a local or remote location. The measurement module can reside in the device or in the cloud.

In one embodiment, the capability, for example, can be done in real-time or offline. The activation of the device can be done, for example, periodically, in response to a trigger event or manually, as needed or desired.

The device can support real-time control and triggers for other devices, e.g., a projector for changing the image the user may see (camouflage), or a trigger event for an accurate threat eliminating device that needs an accurate coordination in front of the camera.

Video can be shared real-time with additional stations. There are multiple ways to share the video. Some exemplary scenarios are discussed in detail below.

Figure 8A:
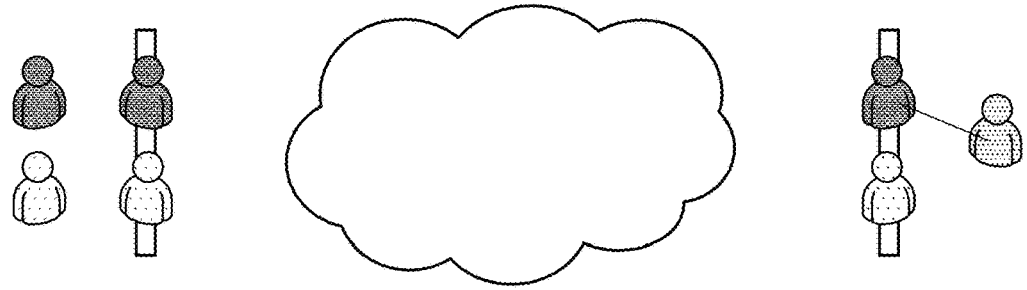
FIG. 8a depicts a sharing mirror experience in a video/voice conference.

Sharing the mirror experience with one or more other users remotely, where the user see himself on a local station and the remote user see the user in the mirror and share with him the experience. The remote user can have any suitable device; the main experience is to see the user who is standing in front of the mirror and is doing something for review. The user will be able to see a mirror image of himself based on EyesMatch or any other technology. FIG. 8a depicts this scenario. The remote user can just see the user broadcast, text the user, speak to the user and/or be seen in a small window on the mirror screen.

FIG. 8a depicts a sharing mirror experience in a video/voice conference. As shown in FIG. 8a, the mirror experience can be shared live with user/users in the cloud or via another mirror station. In the first case, the user can see himself in a mirror mode though the video stream that goes to the cloud needs to pass an additional mirror flip back to correct the gaze orientation on the other side. So, when the user (in mirror mode) looks right or left, his eyes/gaze on the other side will move to the right direction as if he looked at the right direction.

Figure 8B:
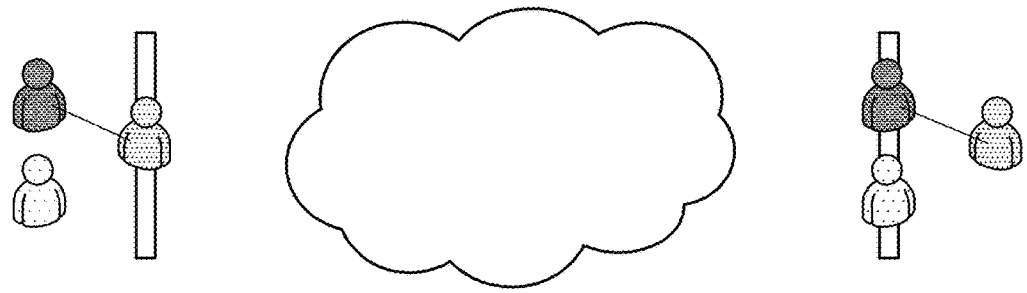
FIG. 8b depicts sharing a fullbody video conference.

FIG. 8b depicts sharing a fullbody video conference. As opposed to a regular video conference where the camera can be streamed "as is" to the other side, in mirror station, the image that is being sent to the other side needs to be flipped left-right on the remote location. This can be done by flipping the mirror captured locally or on the remote side.

In FIG. 8b, when two or more users communicate with each other in the fullbody stations, the user/users in one station will see the user/users from the other direction in the right orientation as well. As shown in FIG. 8b, the user can see himself standing on the left side of the local screen, and the user can see the other user on the right side of the local screen. In this case the local video is already mirrored, an additional flip/mirror will be needed when streaming the video to the remote location/locations (when broadcasting).

Any combination of mirroring, flipping, rotation and the like of the local or streamed video to match this experience of the local mirror and gaze correction on the other remote location are part of the invention.

In one embodiment, both stations are EyesMatched/calibrated to the same geometries and dimensions; every one of the stations creates a full body mirror and sends it to the remote location/locations. The full-body and EyesMatch experience will occur on the video conference as well, and the user will get the feeling they are looking into each other's eyes.

In one embodiment, where there is more than one user in one location, the EyesMatch or body distortion correction can be done per user with tracking capability per user or for both simultaneously. In order to eliminate the line effect, in this case, augmented reality capability can replace the background as described above. In the augmented reality mode, Colograma or another technique can be used to replace the background with a plain background. The connection line can be placed between the users to eliminate lines or discontinuity with respect to the users themselves.

Figure 8C:
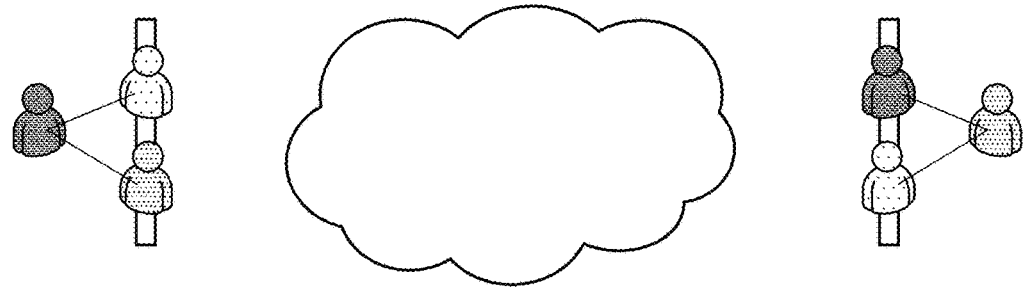
FIG. 8c depicts multiple mirrors/full body stations with split screen or multiple screens.

In one embodiment, where there are more than two stations, the screen can be divided to allow multiple users from multiple locations to be displayed at the same time, or multiple screens can be placed one next to the other as depicted, for example, in FIG. 8c. Specifically, FIG. 8c depicts multiple mirrors/full body stations with split screen or multiple screens. As shown in FIG. 8c, the order the users are depicted in the mirror allows for correct gaze communication. When the user is looking to the right, for example, on the remote screen, after the flip, he will be seeing the user looking left toward the remote user.

This is just an example and any number of users near the screen or in remote location should be organize to allow for right gaze approach. In one embodiment, further gaze and eye contact improvement can be applied to improve the experience. In one embodiment, the screen can include 3D capability, and 3D capability per user in the screen.

In one embodiment, in addition to the EyesMatch or any computerized image processing at one side, the remote location can have additional computerized capability to manipulate on the far end video based on the local user tracking, e.g., if the user gets closer to the screen, the far end video or image will be processed to look a bit bigger and projected to provide a better feeling of a live session. Another example is when a user gets closer on one end, he will see a wider FOV of the far end.

The present invention includes virtual mirror control and virtual system features to ease the usability of the same. The virtual mirror control and virtual system can include station operation modes and modes of operation including, for example, on, off, restart, mirror, display, idle, and the like. The virtual mirror control and virtual system can include authentication and registration of users, which can be automatic, manual and a combination of automatic and manual. The virtual mirror control and virtual system can include an optimal flow of operation to ease and enhance the user experience.

The virtual mirror control and virtual system can include one or more interfaces to control the mirror, e.g., automatic gesture, voice, eye pointing, mobile application, remote expert, local assistance and the like. The virtual mirror control and virtual system can include a comprehensive combination of interfaces, including the following: playing a recorded video (automatic/manual); advance effects (item color manipulation, augmented reality features, gaming features, background change, 3D effect, lighting effect and the like); screen mode (orientation/full size or split screen); sharing techniques and methods to share the experience with friends/experts in real-time and on the go; mobile user application for controlling display and sharing, for example, sharing of personal videos and images taken from the virtual mirror or the user mobile device; retail or enterprise remote for general management (provide retailer information about the user in real-time with advanced control and analytics capability); and a module to teach the user how to operate the mirror (animation, video, voice, visual hints and the like).

Figure 14:
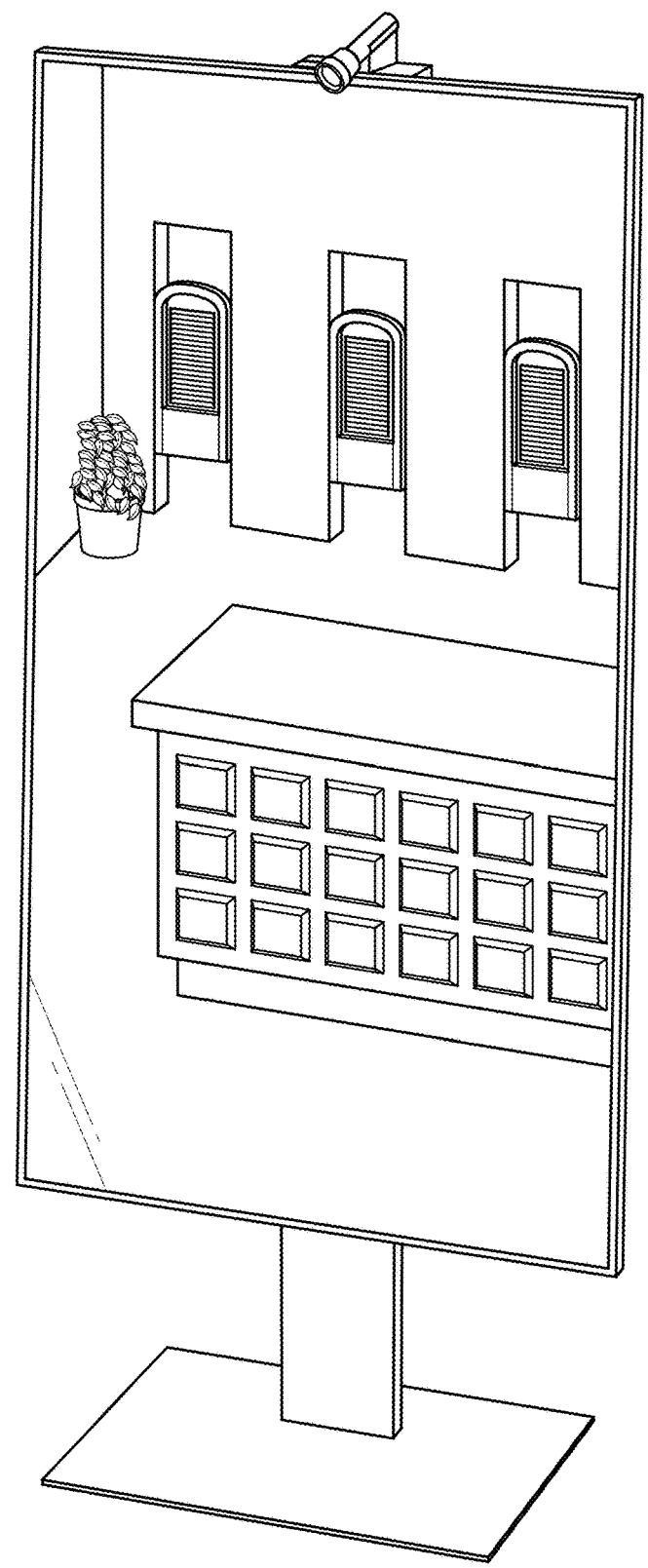
FIGS. 14, 15 and 16 depict examples of a virtual mirror user interface (UI) flow that can be sequenced together to simulate a mirror experience.
Figure 15:
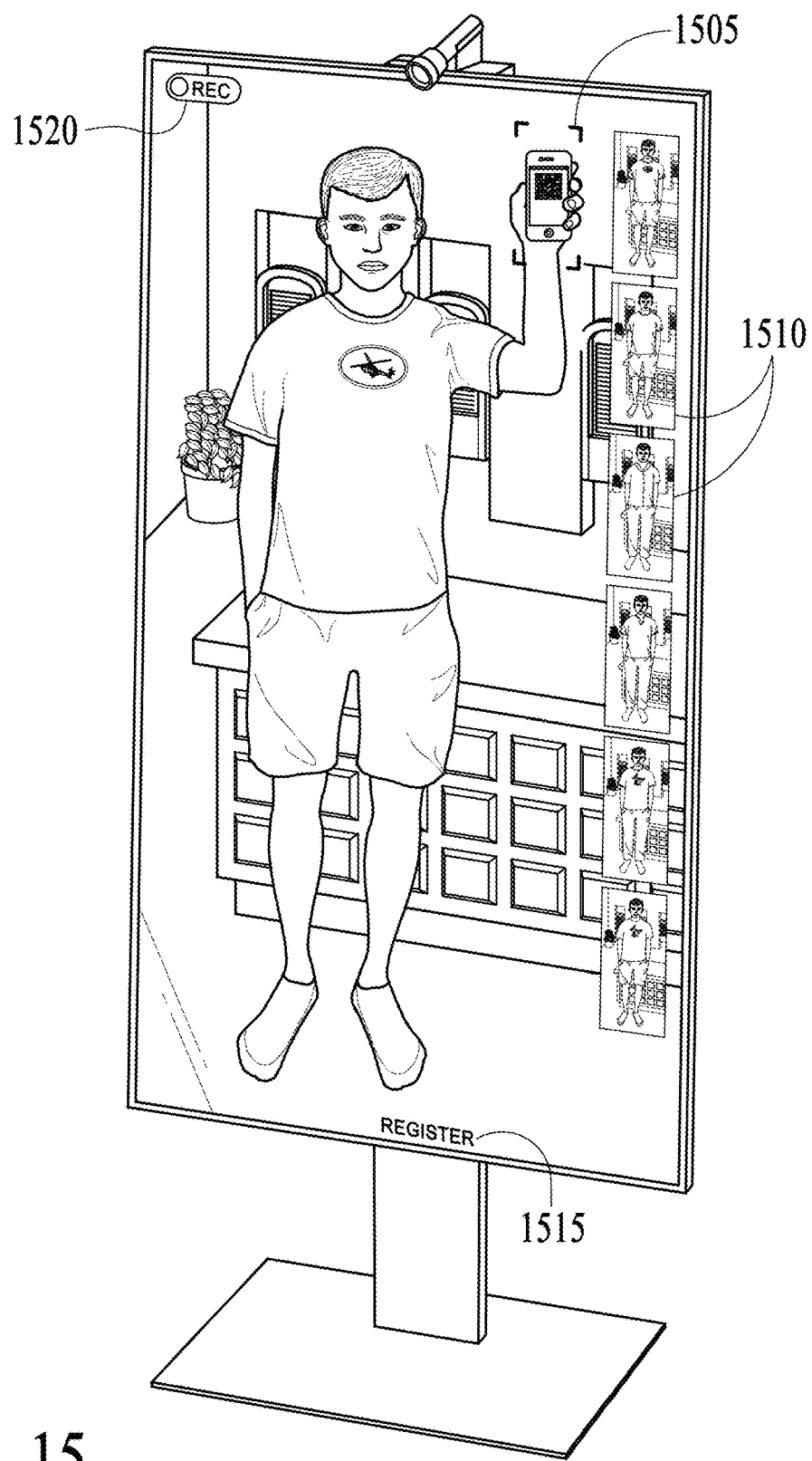
Figure 16:

FIGS. 14, 15 and 16 depict examples of a virtual mirror user interface (UI) flow that can be sequenced together to simulate a mirror experience. For example, before a user stands in front of the mirror, the mirror is capable of tracking the user once the user enters a specified zone in front of the mirror. Based on the tracking, the video engine can calculate a transformation of the image to mimic mirror behavior.

In the idle mode, when there is no user in front of the mirror, the engine can take a default setting (e.g., 2 m) and apply the 2 m transformation on the camera stream to create a mirror effect on the environment as depicted, for example, in FIG. 14. In another embodiment of the idle mode, the mirror can present other videos of models, commercials and the like.

Outside operation hours, the mirror screen and/or the computational device that feed the screen can be turned off or remain on with a screen saver to eliminate rapid aging of the display electronics. The mirror station can be enabled so as to automatically power up. The mirror station can be controlled via remote control locally or through the cloud to reboot and to enter into normal operation.

In one embodiment, the trigger zone can be designated with a carpet. The carpet can be designed with a specific pattern and color that improves the tracking and detection of the user. In addition, the colors of the carpet can improve the quality of the video. For example, lighter colors can be used to improve lighting conditions and improve the quality of the resulting video. In one embodiment, the pattern on the color can be changed of around 5-10 cm with lighter and darker colors so that when a user stands with dark or light color shoes, the user shoes will be easily detected and tracked, and the maximum distance error will not be higher than 5-10/2. In one embodiment, the carpet can include instructions to the users informing the user how to operate the mirror. Alternately, in one embodiment, an operation device can be provided where a user can touch their foot on a receptive pad to operate the mirror with their legs and feet rather than their hands or voices.

In one embodiment, the mirror can prompt the user to stand in the right location, e.g., when a user gets closer, the mirror can switch back to idle mode or the mirror can cut the user legs in the image, and the like.

The mirror can be configured so that, when the user steps into the tracking/registration zone in front of the station, the video engine reacts and starts tracking the object. Based on the object location, the video engine can adjust the video transformation to mimic mirror behavior. Additional input to the tracking can include the user's height, spatial location, pose and the like, as described in the EyesMatch process. At this point, the user is still not registered to the system, so an additional process of user identification can be performed. For example, as described in U.S. Application No. 61/862, 025 the authentication can include face recognition, a special card that a user can present to the system for scanning, a user mobile device (audio, wireless, QR code), or other biometric registration feature. If the user is identified, his account can be opened and his last recording can be displayed, e.g., in one embodiment, a thumbnail configuration can be displayed, such as that depicted in FIG. 15. Alternatively, any other image control bar can be displayed. If the user is not identified, a user registration process can occur, then, after a few seconds, a new account can be opened and the mirror can be configured to start recording automatically.

In one embodiment, the mirror can record for N seconds, e.g., 10-13 seconds is enough time to allow the user to get a good impression on the way a particular item looks and can include, e.g., the user turning around and the like.

In one embodiment, although the mirror can be configured to start recording automatically when it recognizes the user, if the user does not want such auto-recognition, the mirror can be configured to save the video, the user can trigger one of the previous thumbnails, the mirror can be configured to switch to a display mode and the mirror can be configured to play the video. That is, the user can be prompted to execute a process by which a particular scene is cut by the user and not saved in the system.

In one embodiment, a thumbnail can be added on the mirror, which can be useful when the screen is in a narrow configuration, e.g., 21:9, or any other wide screen configuration. In one embodiment, the thumbnail can be displayed so as to pop up in a separate bar next to the mirror stream or under the mimicked video stream. This feature can be useful when the screen is wider than required or proportioned for the mimicked mirror stream.

In one embodiment, as can be seen, for example, in FIG. 15, a recording indicator can be displayed as well. The recording indicator can include display of a phrase like "REC", a red colored circle and the like.

In one embodiment, since facial recognition is not entirely reliable 100% of the time, additional recognition features can be displayed so as to pop up on the screen for an appropriate amount of time, such as a few seconds. In the current example, a QR bracket GUI is opened and the user can show the mirror a QR badge or QR that was sent to his unique application, e.g., on a smartphone, and effectively communicate to the system that the present facial image is associated with the authenticated user. This technique can be used to allow semi-automatic user merging in the event a particular user has more than one facial account. In addition, once facial information is merged, additional facial measurements/improvements can be performed to improve the recognition of the user over time.

In one embodiment, which can be presented at the bottom of the screen, an additional password can be associated with the user, and the user can take this password-based authentication and apply it to the registration process. In one embodiment, an employee or the user himself can enter phone, email, NFC signaling or any other identification information and obtain a link to the cloud on the spot or later. In one embodiment, six (6) thumbnails are presented to the user, though any suitable number of thumbnails can be presented. The size of the thumbnails can be configurable to support a reasonable proportion for the display.

In one embodiment, additional control capability can be added as well, e.g., start recording, erase video, add video effects like lightening, color changes, background selection and the like. In one embodiment, all the videos can be uploaded to the cloud and can be erased in the local station after some period of time. In one embodiment, the videos can be processed after recording with additional effects that improve the video or change the video to reflect augmented reality effects or for BMI/tailor/body line measurements analysis. In one embodiment, the video recording can include the audio recording of the environment for further analysis. In one embodiment, the video recording can include WLAN recording of the environment to record the MAC of the users and later on with further correlation, can be adapted to associate the MAC of the mobile device to the user.

The present invention includes a system for facilitating a user's control of the mirror. In one embodiment, if the user is still in the predefined zone and was recognized by the mirror once, as long as he is still standing there and no one else is being recognized, the user will be able to control the mirror, e.g., play, start and stop images/videos, delete images/videos, add augmented reality features and the like. The user can also control the mirror through gesture control or from his device, e.g., smartphone, through a dedicated application or additional control features as part of the retail application. In one embodiment, the gesture control can enable some basic functionality and the user application can be allowed to enable much more functionality relative to the gesture control. In one embodiment, the assistant in the store or an assistant available virtually/remotely in the cloud can assist the user in operating the mirror. In one embodiment, the user can set his own preferences for the UI from his application or from the web. All user dedicated settings can be added to the user's account, e.g., the user can change the time of a recording, the number of thumbnails and the like.

In a default mode, the user can see his last n videos. The videos may or may not have been taken in the specific mirror location, but may be accessed at a central storage location, e.g., from the cloud. The user can set the appearance of the thumbnails of the local try-on videos. From his application, the user can see all the thumbnails and be able to touch them or any other election method to activate play of the video associated with the specific thumbnail.

In one embodiment, the thumbnails are configured so as to pop up on top of the mimicked mirror stream as can be seen, for example, in FIG. 15. The thumbnails can be sent to the background when the video is playing or in split mode when there is no gesture control identification as shown, for example, in FIG. 16. The user can also set the screen to a split mode as shown, for example, in FIG. 16. Specifically, FIG. 16 depicts a side-by-side setting where the user can still see himself in real-time on one side of the screen and can play previously recorded videos on the other half.

In one embodiment, the remote control of the user can obtain the identified user information automatically so the store assistant can send the user link to his account for registration or to help the user with additional capability like changing clothes colors or changing clothes in general.

In one embodiment, the user can use his mobile device to initiate a video call in the mirror with a remote expert or a friend that can advise him in real time. The call can be from a dedicated application or any other third-party application like Skype. The mirror video stream can be fed to the local Skype and the remote user can get the mirror stream in real time.

Figure 17:
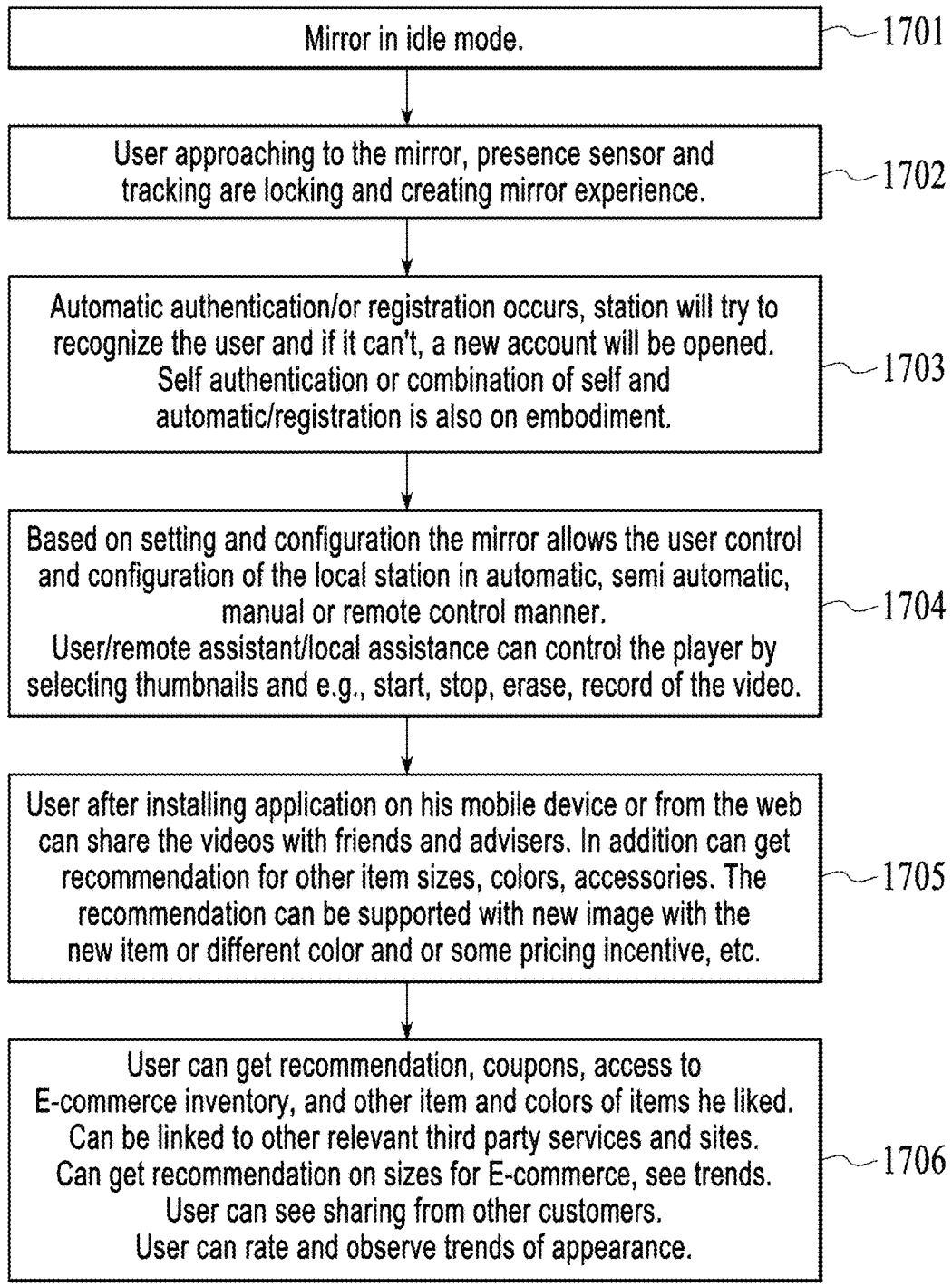
FIG. 17 depicts one embodiment of a suggested flow of usage.

FIG. 17 depicts one embodiment of a suggested flow of usage. Specifically, FIG. 17 depicts an embodiment of user flow of usage of the additional embodiments depicted in FIGS. 14, 15 and 16 and their associated descriptions. In step 1701 the mirror is in idle position, and in step 1702, as a user approaches the mirror, the user's presence is sensed, e.g., by change in the image seen by the camera, and the system initiates operation in mirror mode. At step 1703, the system initiates authentication procedure to identify and authenticate the user. For example, in one embodiment the system uses face recognition to identify and authenticate the user, while in another embodiment the user may be authenticated using a device such as a smartphone with capabilities such as, WiFi, Bluetooth, NFC, etc. If the user has not been identified, e.g., it's a new user, the user may be prompted to open an account. Otherwise, the user may proceed as a guest, albeit some features, such as remote access to stored images, may not be available.

In step 1704 the user is given user control over the display. In one embodiment, the specific control preferences are saved for each particular user and are activated once the user has been recognized. Otherwise, general user interface is enabled, e.g., a hand gesture activated interface. In one embodiment, when a user has been recognized, or has tried on several outfits in the same session, prior trials are presented as thumbnails on the side of the main display. When the user raises the hand corresponding to the side of the thumbnails, depending on the height of the hand, a corresponding thumbnail is highlighted for selection. As the user raises or lowers the hand, another thumbnail corresponding to the height of the hand is highlighted for selection. Then, when the user closes his fist, the highlighted thumbnail is selected and the corresponding image or video is displayed on the main screen.

As shown in 1705, the images and video of each session may be stored on the cloud, and may be accessible remotely using, e.g., smartphones, tablets, etc. Thus, a user may converse with friends remotely and get their opinion on the outfit the user is trying. For example, the user may send the friend a link to the recorded trial or to a live streaming video from the system. Thus, the user may share the shopping experience with people located remotely.

Moreover, as also shown in 1705, since the system is able to identify the user and also calculate parameters of the user, e.g., weight, height, etc., the system may be able to access a database of available items that would be recommended to the user based on these parameters. More specifically, if the user has recorded two trials of two different shirt within the same session, the system can decipher that the user is interested in purchasing a shirt and make either alternative recommendations, i.e., different shirts, or complimentary recommendations, e.g., specific pants that go well with the tried on shirts. Also, since the system can identify the shirt and the brand of the shirt, it may be able to offer specific incentive from that manufacturer, as exemplified in 1706.

Also, in 1706 the user may be offered the ability to change colors without having to actually change the garment. As explained above, by the user of multiple masks or layers, the system is able to change the color of the article, while maintaining the realistic visual effect of the fabric as it is worn by the user. Since the system may maintain a layer of shading, a layer of texture, a layer of reflection, etc., the color layer may be changed while maintaining all the other layers, such that the rendered image retains all of the characteristics of the prior image, with only the color changed.

In order to avoid complication of the flow of the experience in front of the mirror, a complimentary application can enable additional features and settings, e.g., an advanced user that is comfortable with gesture control can enable more gestures that will help to operate advanced features without use of a tactile interface application. For users that are not comfortable with hand gestures, such users can be provided with basic automated features and the mobile application can be used to operate the other advanced functionality.

Figure 18:
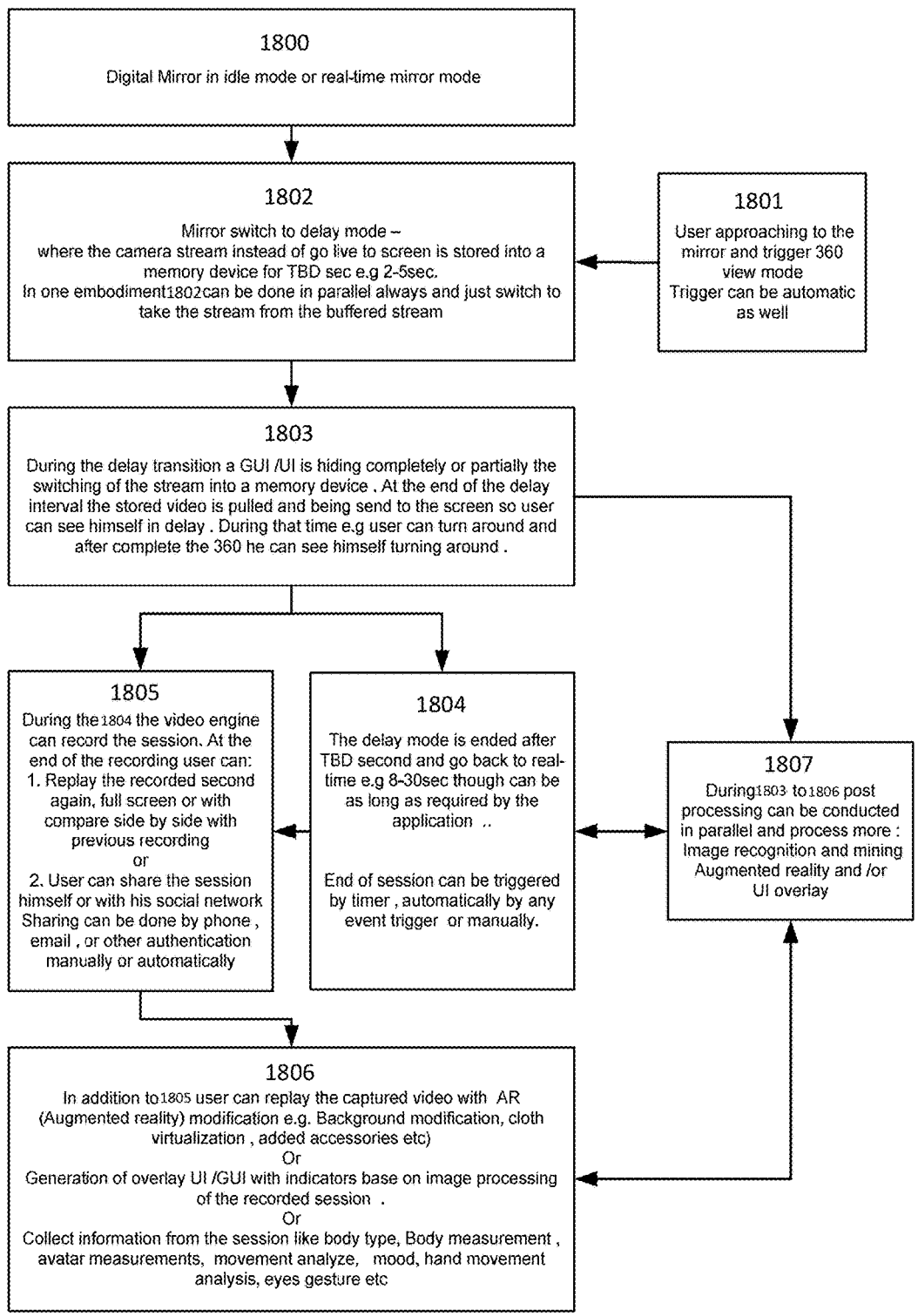
FIG. 18 depicts one embodiment of a suggested flow of usage for delay mode.

FIG. 18 is a block diagram for explaining a delay mode operation of the mirror. The delay mode can be implemented in any of the embodiments described herein. Notably, the delay mode may be implemented in software, hardware or combination of software and hardware. For example, the delay mode may be implemented in a computer readable media storing a program that, when executed by a processor, causes the mirror to implement the delay mode of operation.

The delay mode can be best understood by reference to it solution to one well-known deficiency of traditional mirror. Namely, when a person tries an outfit in front of a traditional mirror, that person has difficulties seeing how the outfit looks in different angles, and especially from the back. This problem is solved by the various implementations of the delay mode, as exemplified below.

In various implementations of the delay mode, the mirror system solves the traditional mirror problem by replying a fitting session using a delay, so that a user may see the session at a semi-real time. For example, the user may try an outfit in front of the mirror and spin 360 degrees. The recorded fitting session will be played in semi-real time by implementing a delay in the replay of the session. Thus, when the user completed the spin and is facing the mirror, the session starts the replay, so that the user may see the entire spin and can see the outfit from different angles, including from the back.

The delay mode may be implemented many ways. For example, the system may be set with two parameters: delay time and recording period. Delay time indicates how long the delay of the replay is, and the recording period indicates how long the recording session is. For example, it may be figured that an average user takes 20 seconds to try on an outfit and spin 360 degrees to check the outfit in all angles. In such a case, the recoding period may be set to 20 seconds. Then, the delay may be set, e.g., zero to five seconds. In such a case, when the fitting session starts, the system records a session of length 20 seconds. If the delay is set to zero, the system will start replaying the session immediately after it completed recording the 20 seconds session. Conversely, if the delay time is set to five seconds, the session will be played five seconds after completing the 20 seconds session recording.

Figure 19:
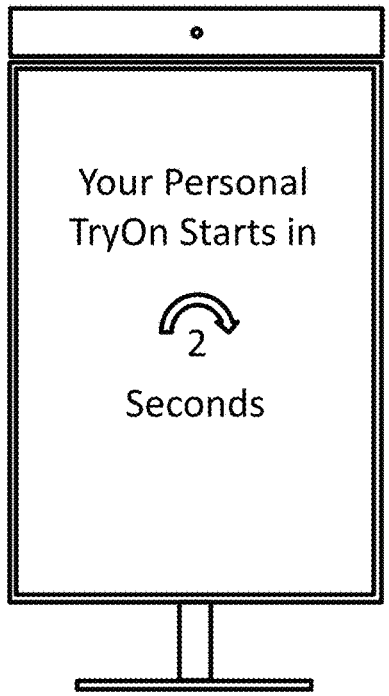
FIG. 19 depicts one embodiment of a GUI for delay mode.

Various embodiments handle the projection on the screen during recording differently. For example, in one embodiment, before and/or during the recording session the system projects on the screen instructions for the user, e.g., cuing the start of the session or instructing the user to spin. Such an example is illustrated in FIG. 19, providing a timer for the start of the session. The cuing can start after the user activating the delay mode session, e.g., by selecting a start button, or automatically when the mirror system recognizes the presence of a user in front of the mirror and exits idle mode. In another embodiment the mirror system projects a live mirrorized video of the session, but also records and replays the session according the parameter setting of the delay mode. One advantage of projecting a live mirrorized video of the session is that it maintains the appearance of standard mirror, making it easier for a user to interact with the mirror system. Thus, in such an embodiment, as the camera records the session, the processor applies the various transformations as detailed in the above embodiments so as to generate mirrorized video stream, which is displayed on the screen, but also stored in memory. When the session recording period ends and delay time expired, the mirrorized video is fetched from memory and is replayed on the screen.

An embodiment of the delay mode will now be described with reference to FIG. 18. Block 1800 indicates that the mirror is in idle mode or in real-time mirror mode, as explained in various embodiments herein. In real-time mirror mode the user can see himself/herself live in the digital mirror. In this mode, the camera sends a video stream to the processor, which processes the stream to be projected as digital mirror stream (mirrorized video). Alternatively, the mirror may be in some idle mode, showing commercials, demo mode, explanation how to operate the mirror, etc.

Block 1801 indicates that a user has approached the mirror. This event may be detected by the mirror system automatically by, e.g., analysis of the video stream from the camera, using motion sensor, etc. The appearance of the user in front of the screen may be used to automatically enter the delay mode. Alternatively, switching into delay mode can be done manually by user using, e.g., remote control, voice, gesture, etc.

In block 1802 indicates that the mirror switched into the delay mode. As explained above, the delay mode can be configurable i.e., the length of the delay and the length of the recording session. The delay mode should be configured to provide enough time so user can see himself/herself in semi real-time and preview the movement while still have the feeling of seeing himself/herself in a mirror.

The delay can be implemented in multiple ways but one way is to direct the live stream from the camera into a memory device e.g. RAM, solid state drive, hard drive, etc., for 2-5 second. Once the FIFO buffer is filled, the stream is pulled out frame by frame into the graphic card and rendered into the screen. If the graphic card has enough memory, the FIFO buffer can be defined in the graphic card, but if not, RAM is a good option for short delay. Otherwise, for long delay, a solid state or a hard drive is a better solution. The mirrorizing transformation can be done prior to storing in the memory or after fetching the frames.

In one embodiment, during the delay time the image is frozen on the screen, or some graphics are displayed on the screen. In one embodiment, during the delay initiation time a GUI is hiding the frozen image, so users can't see what is happening to the mirror/camera stream.

In one embodiment the stream from the camera is always split to live stream and memory buffer. In real-time mode the live stream is being rendered to the screen, and buffer clears the last frame once it gets a new frame. In delay mode the live stream is cleared frame by frame during the delay mode and the frame that exits the buffer is being rendered into the screen. In this way the transitions between delay and real-time are fast. In this embodiment the mirrorizing transformation is better done prior to storing in the memory and rendering the live stream on the screen.

Block 1804 represents the delay session. In one embodiment the delay mode is implemented by simply sending the video stream to a FIFO buffer, wherein each frame is fetched after a set time delay. The length of the delay can be set beforehand. Consequently, once the mirror system enters the delay mode in the embodiment, the user continuously sees on the screen a semi-real time, i.e., a delayed mirrorized video stream. In other embodiment, the duration of the delay mode can also be configured e.g. 8-30 sec, after which the mirror system returns to real-time mirror mode. During the period of time of the delay mode the user will see the mirror stream in delay, i.e., semi-real time. So when the user turns around the user gets enough time to complete a 360 spin movement and when the user is done, the user can see himself/herself turning around to preview 360 view, or any other movement the user likes to capture in semi-real time manner. In another embodiment a delay period and delay mode duration are set beforehand. In this embodiment, one the system enters delay mode the video stream is stored in a FIFO memory, however, the images are not fetched until the delay mode duration has passed and the delay period has passed. Only then the images are fetched and displayed as a delayed mirrorized video.

In either of the delay mode embodiments described herein the user may be given the ability to pause, rewind or replay the delayed session.

Block 1805 illustrates optional features. According to this optional embodiment, in parallel to the semi real-time preview (delay mode), the mirrorized stream can be captured into memory so that at the end of the session the user can replay his session and see himself again. Here as well, the user may be given the ability to pause, rewind or replay the delayed session. In case user log in he/she can choose to compare with previous recording full screen or side by side as well.

Also, by storing the session in memory, the user is able to download the session to a mobile device, share the session via, e.g., social network, send a link to family and friends, etc. That is, once the session is over and the recorded file is created as image or video and optionally compressed, the file can be shared. Sharing the file can be done by, e.g., uploading the file to the cloud, to designated user phone number, email, QR code or automatically authenticate code from short range communication like NFC, BT, etc. Once the file is stored in the cloud, the user can get a link to open the video and/or share it from responsive app directly with his social accounts. Alternatively, or in addition, the user may get the file directly from the mirror system to his device wirelessly. Also, the system may upload video to the cloud, but instead of sending a link to the video, the user may be able to access his recording from a dedicated application that has access to his account from the API.

In block 1806, once the file is recorded and the user would like to explore the session with image modification, the user can replay the video into an image processing engine, real-time or post processed, to, for example, change the background of the scene, modify color or fabric of his clothes or add accessories like glasses, etc. Additionally, in 1807 the stored video can be analyzed in retime or post processing for adding designated UI and/or virtual reality to the video, or just to generate more information that can be used by the application (e.g., calculate BMI as explained above).

In one embodiment the recording is starting at the end of the switching period, in one embodiment the recording starts after few second into the delay mode, while in one embodiment the recording starts and stops by automated event detection, like orientation of user face, user starting to turn around, etc., as will be further explained with reference to FIG. 20.

In one embodiment, the user will initiate the delay mode manually or automatically for a few seconds, e.g., 5-30 seconds, and the engine will start delay mode. At the end of the delay timer, the system will automatically return back to real-time mode. In one embodiment, the delay length in the delay mode is shorter than the delay mode period, e.g., the delay length can be configure for 2-5 seconds, while the delay period to 15-30 seconds. In such an arrangement, the mirrorized video is start streaming onto the screen after 2-5 seconds, while the entire session will last 20-30 seconds, after which the system will revert to real-time mode. Additionally, if it is detected that no user is present in front of the mirror, the system may revert to idle mode.

In one embodiment when delay mode triggered manually or automatically the real-time rendering freezes to the duration of the actual delay, and optionally a GUI is imposed over the screen. The video stream during that time is directed and saved e.g., into a memory buffer in RAM or HD. After the buffer is full, or after the delay length is reached, the renderer gets the delayed stream from the buffer and the user can see himself in delay. At the end of the delay mode the video stream goes back to real time.

In one embodiment during the time of feeding the buffer with the stream and freezing the renderer, a GUI or UI is being rendered on the screen, and may hide completely or semi transparently the freezing of the real-time stream. In that way the transitions between real-time and delay mode are smoother. The UI basically hides the period of accumulating the buffer.

In one embodiment the buffer is always filled in parallel to real-time presentation, and the renderer simply switches between getting the feed from buffer with delay or from the real time feed. In such an embodiment there may be no need to hide the delay accumulation.

In one embodiment during the delay mode the engine automatically record the user and at the end of the delay mode the user can elect if he like to play the delay mode session again or to get the session to himself or to share directly into his social network.

In one embodiment the user can play the delayed session in a split screen to compare with real-time or compare with other recording.

In one embodiment the user can elect to post process the recorded video with different background image or video or different fabric different color or completely different clothes and accessories.

In one embodiment during the delay session the user can invite friend or sale associate or stylist to help with the session.

In one embodiment the delay session may be use for other applications, in addition or instead of trying clothes. For example, the delay mode may be used in weight-loss program, dancing, Gym practice, body scanning, and other sports.

In one embodiment the system can automatically stop and freeze the image of the user's back for a set time period or until the user instructs the system to resume delay or real time mode.

In one embodiment system will automatically switch into delay mode when a user is recognized as entering the field of view or when it is determined that the user within the field of view performed a triggering motion. For example, when used for trying on clothes, the triggering motion may be when the user starts turning around. For other use cases, other motions can be pre-programmed as being a trigger motion and the analysis of the feed from the camera would be searching for that pre-programmed motion. When the pre-programmed motion is detected, the system issues a signal to revert to delay mode. In other example, the system may be used for Golf or Baseball, such that the triggering motion would be a swinging of the club or bat.

Figure 20:
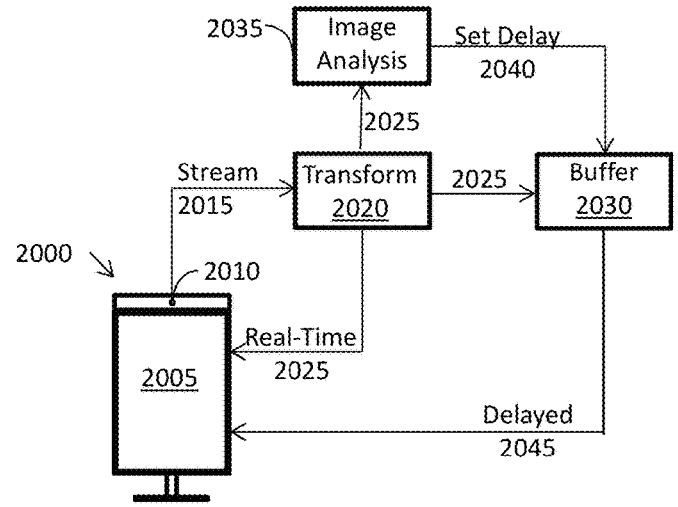
FIG. 20 depicts one embodiment of a digital mirror system for implemented automatic switching of idle, real-time and delay modes.

An embodiment implementing automatic entry into delay mode is exemplified in FIG. 20. In this example, video camera 2010 of mirror system 2000 sends captured video stream 2015 to a transformation module 2020. The transformation module 2020 operates on the video stream 2015 to generate real-time mirrorized stream 2025. The transformation module 2020 may be implemented according to any of the embodiments described herein, following any of the methods and processes described herein to transform a video stream from camera 2010 so as to generate an image that mimics an image of a mirror.

The real-time mirrorized video stream 2025 is sent to the screen 2005 during a real-time mode or idle mode of operation. The real-time mirrorized video stream 2025 is also sent to buffer 2030 and to image analysis module 2035. Image analysis module 2035 continuously analyzes the real-time mirrorized video stream 2025. When the image analysis module 2035 detected a user appearing in the real-time mirrorized video stream 2025, it issues an instruction to the system controller to change from idle mode to real-time mode. Additionally, when the image analysis module 2035 detects that the user starts turning around, the image analysis module 2035 issues an instruction 2040 to the controller to enter delay mode. Upon receiving the indication to enter delay mode, the time of the current frame in the buffer is noted and the counter starts counting the delay length. When the delay length is reached, the images are fetched from the buffer 2030 as delayed stream 2045 and are sent to the screen 2005 for delayed presentation.

In one embodiment, it is assumed that it took some time for the image analysis mode 2035 to sense that the user starts turning. Therefore, in this embodiment, upon receiving the indication to enter delay mode, the time of the current frame in the buffer is noted and the counter starts counting the delay length. When the delay length is reached, the images are fetched from the buffer 2030 as delayed stream 2045 and are sent to the screen 2005 for delayed presentation. However, the fetching of images from the buffer start with images recorded an advanced period before the noted time. For example, the delayed stream 2045 starts from image that was recorded in the buffer 2-5 seconds before the time that the image analysis module 2035 issues the instruction to enter delay mode.

In one embodiment user can elect if system in delay mode record his session or not.

In one embodiment user can set the system to automatically send the video to his cloud account/mobile device, or dedicated app.

In one embodiment mirror will identify the user by his smart watch, mobile application, or other identifier.

In one embodiment mirror or remote kiosk will transmit a beacon and the user's mobile device or smart watch can pick it and use the information to get access and control on the mirror. E.g. identified user that get access will automatically get the recoded session into his device or cloud account.

In one embodiment, the mirror station can be configured to identify the user's behavior and adapt the gesture control to the way the user is trying to operate it, e.g., some users will point, some users will grab, and some users will push to operate a thumbnail. The system can be adapted to learn and update a profile control per user.

In one embodiment, the mirror station can support instruction to the user, so that when the system identifies a user that is not controlling the mirror in the correct manner, a short explanation can pop up and guide the user through the process.

In one embodiment, the mirror can be adapted to demonstrate predetermined characteristics based on information regarding the user's familiarity with the system, e.g., based on whether the user is a first time user, based on the number of videos in the system for the user, based on the last time the user required the system to enable instructions, can be adapted to provide relatively simpler functionality voice assistance, can be adapted to provide remote expert assistance and the like.

In one embodiment, the concept of a pre-defined number of thumbnails, as shown in FIGS. 15 and 16, can be replaced with a slide menu of thumbnails.

In the normal operation mode as depicted, for example, in FIGS. 15 and 16, the user can move his hands up and down to select thumbnails, once the user's hand stops, the closest thumbnail can be elected and can be designated such that the user will get feedback for the selection. For example, blue shade can be provided around the selected thumbnail to signify its election. When the user grabs, pushes or points his hands/fingers at the thumbnail, the video can start playing based on the display mode setting, and the user can also stop the video and perform other operations and the like. Once the user, for example, stops the played video, a hold bar can be displayed on the thumbnail to designate the status of the played video and to acknowledge back to the user that his command was accepted by the mirror station.

In one embodiment, to simplify the operation further, the gesture control by hand can be configured to detect a jump between a thumbnail even if the user is moving his hands left and right instead of up and down or any other direction. The system can be configured to adapt itself to the user's span and velocity of hand movements, so that the user can see the election so he can adapt his speed and span of movement as well.

In one embodiment, the logo of a specific brand or partner or any other logo can be added to the recorded video, so the user will get, e.g., video with the logo of the brand, and the user can share the resulting video with his friends.

In one embodiment, the mirror can be configured to provide convincing augmented reality capability by an item that was previously tried on by another user with a similar body type. This matching technique yields a much more convincing experience.

The mirror can be configured to conduct business. Since the mirror station according to the present invention is a new device in the marketplace, uses of the mirror to create a revenue stream is unique as well. The next few embodiments include details regarding how an active mirror can be used to create a revenue stream.

The mirror can insert commercials, coupons and logos into the mirror in idle mode, within a specified portion of the mirror or via split screen mode. The mirror can also introduce commercials, coupons and logos into recorded videos so a user can view the video with the commercial/coupon/logo. These displays can be sold as advertising. The user can share the commercial/coupon/logo. The user can be offered an incentive in exchange for sharing the commercial/coupon/logo.

The user's try on of clothing can be analyzed for measurements/characteristics such as BMI, sex, origin, age, body measurements, facial expression, voice expression, recommended sizes and the like. This data can be incorporated into ecommerce applications. This data is of high value and can be shared with brands, the user, a third party based on an agreement with the user and the brands, etc. Utilizing the present invention, a revenue stream can be generated from the analyzed data regarding the user, for example, by presenting the user with focused and accurate advertising.

The mirror can be configured as a service that allows a user to engage experts, a friend or an advisor with the user contemplating a particular purchase. Additional revenue can be generated using the present invention by promoting up sale opportunities related to the advice of the remote expert. The experts can be rated by the user, and user can pick his own favorite expert or select an expert designated by the brand.

The user can be presented with a display including a suggestion and/or incentive for a particular item tried on by the user, for example, with different colors. This method presents a further opportunity to promote up-selling. Augmented reality can be used to promote up-sales. Specifically, based on information obtained by the mirror and other user tries, a more compelling augmented reality display can be generated based on a combination of information about the user and similar users that have a similar body type.

In one embodiment, the social network of the user can be integrated in a manner to help the user and/or comment on the user's contemplation of the item. The system can be configured to share the user's videos. The social networking features can be used to enlarge the database of addressable customers.

In one embodiment, the user can upload their own photos, the video engines can be configured to process the images and provide similar analysis of BMI, face origin and the like. The system can provide recommended sizes for ecommerce applications. The system can show the item that was bought in different colors. In this manner, the mirror can be used to obtain marketing information for an appropriate database even when the user isn't physically standing in front of the mirror itself.

In one embodiment, the user can see his predicted size in the application and update the measurements, which can be used to improve the size prediction model and include adjustments for particular brands.

The present invention includes the mechanical design and appearance design of the equipment. The screen can be mounted so as to stand on the wall either vertically or horizontally or can be switchable between vertical and horizontal (by a larger or similar mechanical solution, the screen can be tilted, rotated and the like). The screen can be mounted on a dedicated stand, mounted on a wall or mounted behind the wall. When the screen is inside the wall, thermal ventilation duct should be provided to support the screen and the computing device.

Figure 21:
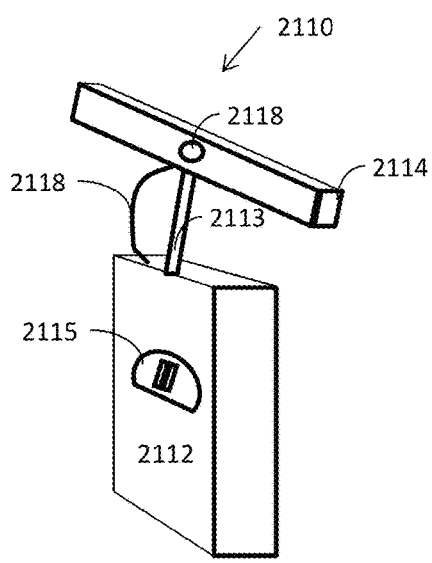
FIG. 21 depicts an embodiment of a fully-contained unit that can be attached to the back of any TV screen and turn the TV screen into a digital mirror.
Figure 22:
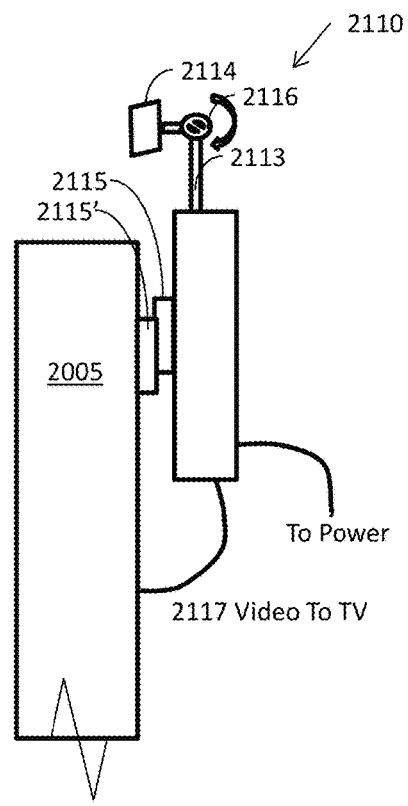
FIG. 22 is a side vide of the unit of FIG. 21, shown attached to the back of a TV.

FIG. 21 depicts an embodiment of a fully-contained unit that can be attached to the back of any TV screen and turn the TV screen into a digital mirror, while FIG. 22 is a side vide of the unit of FIG. 21, shown attached to the back of a TV. One advantage of the embodiment shown in FIGS. 21 and 22 is that the system can operate on any digital TV, so that the purchaser of the unit can either use an existing TV or purchase TV of his/her choice. That can dramatically reduce the cost of the system, especially if one already owns a TV. Also, the system can be installed on any TV, such that the TV can be used regularly as a TV, and switched to a mirror whenever needed.

As illustrated in FIGS. 21 and 22, the digital mirror system 2110 comprises of an enclosure 2112, which houses a processor. In one embodiment, the processor is a mini-PC, such as the Brix series, available from Gigabyte Technology™ of Taiwan, and which is available for consumer purchase in electronics stores, such as Fry's Electronics and MicroCenter. The advantage of using a mini PC is that it's an ultra compact PC design, measuring a mere 62×111.4× 114.4 mm. This makes the entire system extremely compact and easily attachable to the back of any TV using an attachment mechanism 2115. The attachment mechanism 2115 can be a VESA bracket in case the TV is mounted to the wall, or other attachment mechanism, such as a specially designed mechanical clamp, a double-sided adhesive, Velcro®, etc. As shown in FIG. 22, when attaching the enclosure 2112 directly to the back of the TV 2005 a two part attachment mechanism may be used, indicated as 2115 part attached to the enclosure 2112, and part 2115' attached to the back of the TV 2005, wherein the two parts 2115 and 2115' attach to each other, either mechanically, using adhesive, Velcro®, etc.

The processor inside the enclosure includes a microprocessor, such as Intel Core, memory, a DSP to process the video, wireless transmitters, such as WiFi, Bluetooth, etc. For example, the Brix includes an Intel Core processor, Solid State or hard drive memory, wireless transmitters, and LAN connection. Importantly, for enhanced visualization, the Brix includes a 4K resolution HDMI output 2117, which is connected to the HDMI input of the TV 2005. Also shown in FIG. 21 is the power input to the processor, which is connected to a standard 110V or 240V outlet, depending on the country. Also, a high quality digital signal processor may be used to obtain the best results for processing the video signals. For example, the Intel® Iris® Pro graphics card may be used for the video processing.

The enclosure 2112 includes an extension 2113 upon which a photosensor housing 2114 is mounted. In the embodiment of FIG. 22 the photosensor housing is mounted to the extension 2113 via an adjustable coupler 2116, so that the elevation of the field of view of the photosensor can be adjusted by, e.g., rotating the housing 2114 about coupler 2116, as shown by the curved arrow. The photosensor (not shown) is housed inside the housing 2114 and sends its signal to the processor for processing over cable 2118, shown in FIG. 21 for illustration purposes, but should be hidden from view. Cable 2118 may be electrical cable or fiber optics.

According to one embodiment, system for enabling real-time and delayed video play is provided. The system may be used to mimic a mirror to thereby enable a user to try a clothing item. The system may also be used for various training purposes, wherein the mirror mimicking function may be omitted. The system comprises: an enclosure configured to house therein a processor, the enclosure having an extension; an optical sensor housing coupled to the extension; a processor housed within the enclosure, the processor comprising a memory and a video engine and having an output configured to sending digital images to a digital screen; an optical sensor housed within the optical sensor housing and having means to send images to the processor; and an attachment mechanism configured to attach the enclosure to a back of a digital screen.

Figure 23:
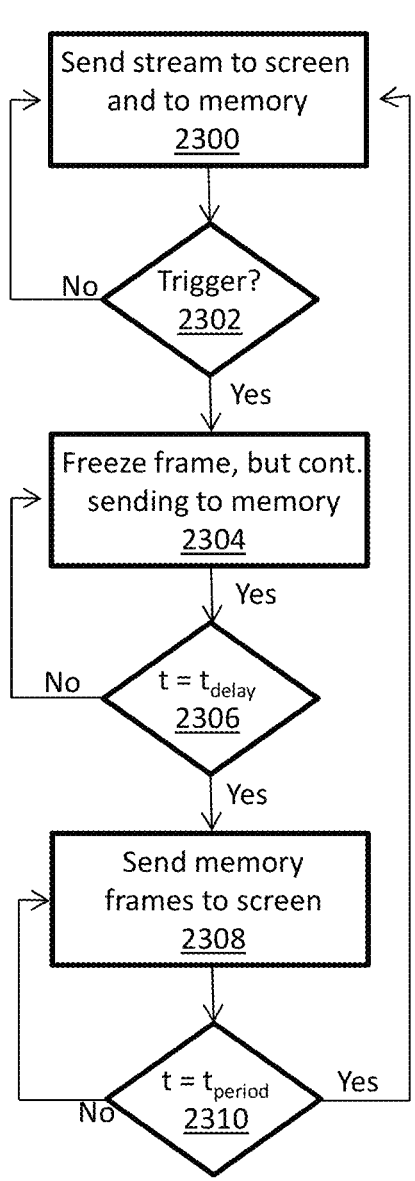
FIGS. 23 and 24 illustrate flow charts of processes that can be implemented by any of the embodiments disclosed herein to enable automatic display of delayed video.

FIG. 23 illustrates a flow chart for a process that can be executed by any of the embodiments disclosed herein. Step 2300 illustrate a normal operating condition, wherein the live video stream from the photosensor is presented on the screen and also saved in memory. When the screen is operating as a digital mirror, the live video stream can be processed before presenting it on the screen and/or storing it in memory, by applying the flipping and transformation so that it mimics a mirror. Otherwise no flipping or transformation is needed.

At step 2302, when a trigger is issued, e.g., by a user clicking an icon, by analysis of motion in the live video stream, etc., the system enters the delay mode. In this embodiment, when the system enters delay mode, in step 2304 the frame presented on the screen at that instance is frozen or paused. However, the live video stream from the photosensor is continued to be stored in the memory. A delay time is being monitored and when time reaches the present delay time at 2306, the frames from the memory are sent to the screen at 2308, starting from the frame immediately following the frozen frame. During that time, a delay period is monitored and, when at 2310 the delay period is reached, the system reverts to normal operation 2300. From testing it has been shown that the delay time is best set to be shorter than the delay period. Also, from experience it has been shown that the delay time is best set from one to five seconds, while the delay period from five to thirty seconds.

Figure 24:
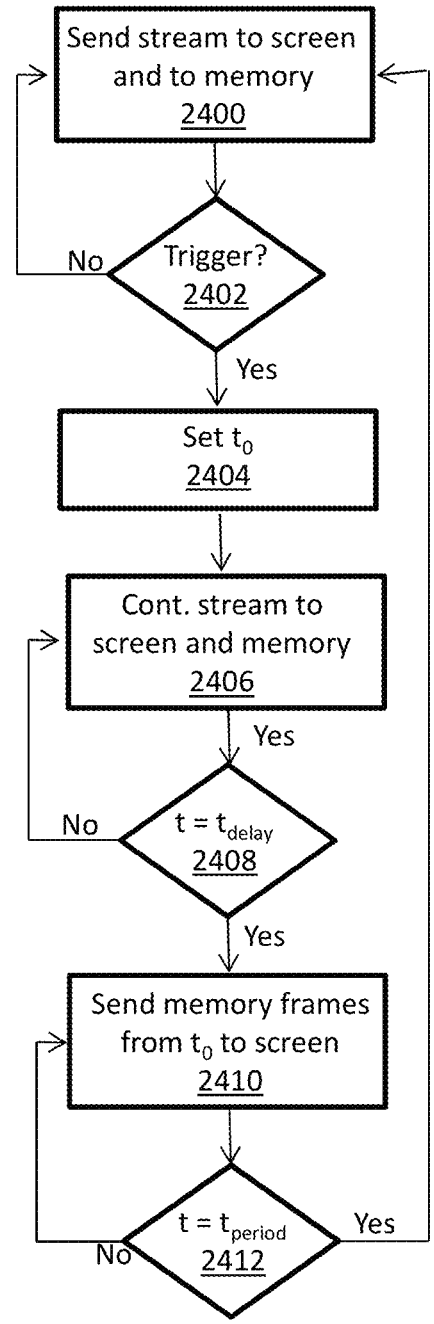

FIG. 24 illustrates a flow chart of a process that can be implemented by any of the embodiments disclosed herein. Step 2400 illustrate a normal operating condition, wherein the live video stream from the photosensor is presented on the screen and also saved in memory. When the screen is operating as a digital mirror, the live video stream can be processed before presenting it on the screen and/or storing it in memory, by applying the flipping and transformation so that it mimics a mirror. Otherwise no flipping or transformation is needed.

At step 2402, when a trigger is issued, e.g., by a user clicking an icon, by analysis of motion in the live video stream, etc., the system enters the delay mode. In this embodiment, when the system enters delay mode, in step 2404 a time is marked, e.g., by storing the time at which the trigger was issued or by marking a delay frame, e.g., by storing the memory address of the current frame, i.e., the frame that was stored at the instance the trigger was issued. At 2406 the system continues to present the live video stream on the screen and the live video stream from the photosensor is also continued to be stored in the memory. The delay time is being monitored and when time reaches the present delay time at 2408, the frames from the memory are sent to the screen at 2310, starting from the time marked at step 2404. During that time, a delay period is monitored and, when at 2412 the delay period is reached, the system reverts to normal operation 2400. From testing it has been shown that the delay time is best set to be shorter than the delay period. Also, from experience it has been shown that the delay time is best set from one to five seconds, while the delay period from five to thirty seconds.

The methods illustrated in FIGS. 23 and 24 are especially beneficial since the user will most likely miss the transaction from live stream to delay stream, since at that instance the user will not be looking at the screen. For example, a user using the system to improve a golf swing may look at the screen when taking position, at which time the user will see live feed. When the user swings the user will not be looking at the screen, and that is when the transition to delay mode will occur and the user will not see it. After the user made the swing, the user may look at the mirror, at which time the user will see the screen playing the delayed frames and can inspect the swing. Thereafter the system will revert to normal operation. Thus, the unnatural jump from either a frozen frame or live stream to the delayed video stream will most likely not be seen by the user.

In one embodiment, the screen can have a proportion of a mirror, e.g., 21:9.

In one embodiment, the screen can have a regular proportion, i.e., 16:9, and the setting of the display can be split screen or dark bars on the sides to yield the mirror proportion, i.e., 21:9.

In one embodiment, the screen can come in a matte finish to eliminate reflections that can be seen on dark colors. In other words, when the user wears black, and the screen is not matte-finished, the user can see his own true mirror reflection; this effect is not wanted and can diminish, distort or completely ruin the virtual mirror effect.

The frame can be presented in a manner as depicted in FIGS. 14, 15 and 16. A minimal frame can be used or the frame can be hidden behind a wall.

In one embodiment, the cameras or the controlled cameras can be located in the frame. The camera can be mounted above the screen frame, can be hidden and can be mounted on the wall. The camera can be provided with a shade that can be filtered out from the image. Since the camera is facing down, a cover that will hide most of the camera body can block the view from a distance.

The screen can be LED, LCD, plasma, glass, projector and the like.

A background can be used that enables better white balancing that results in higher quality videos.

Lighting can include a combination of white, yellow or any combination in a spot or a projector combination and can be configured to improve the video quality and the colors.

A dedicated carpet can be used to allow background changes, to define a user zone, to improve user detection and tracking in front of the mirror, to instruct the user where to stand and to instruct the user on how to operate the mirror.

Each of the above identified modules or programs corresponds to a set of instructions for performing a function described above. These modules and programs (i.e., sets of instructions) need not be implemented as separate software programs, procedures or modules, and thus various subsets of these modules may be combined or otherwise re-arranged in various embodiments. In some embodiments, memory may store a subset of the modules and data structures identified above. Furthermore, memory may store additional modules and data structures not described above.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

Computing devices typically include a variety of media, which can include computer-readable storage media and/or communications media. Computer-readable storage media generally can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media, e.g., stored on a server coupled to the cloud.

The foregoing description, for purpose of explanation, has been described with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles of the aspects and its practical applications, to thereby enable others skilled in the art to best utilize the aspects and various embodiments with various modifications as are suited to the particular use contemplated.

We claim:

1. A computer implemented method for automatic presentation of delayed video, comprising:
setting a delay period of N seconds;
setting a recording length of M second;
obtaining live video feed from the camera;
simultaneously sending the video feed to the monitor to be displayed as the real-time video stream and saving the video feed as frames in the memory;
upon receiving a trigger, performing:
indicating a trigger time at the time of receiving the trigger;
counting N seconds from the trigger time and then fetching the frames from the memory and sending to the monitor for display as a delayed video stream, starting from a frame that was stored at the trigger time, and simultaneously continuing to store the video stream to the memory;
after fetching a series of frames for M seconds, stopping the fetching and reverting to sending the video feed to the monitor for display as real-time video stream.

2. The method of claim 1, wherein the trigger is generated by continuously analyzing the video feed and issuing the trigger when it is determined that an object in the image has moved a prescribed distance.

3. The method of claim 1, wherein the trigger is generated by a user pressing a trigger button.

4. The method of claim 1, further comprising enabling a user to pause replay of delayed video.

5. The method of claim 1, wherein the length of the delay period is configured to be enough time to allow a user to turn around.

6. The method of claim 1, further comprising overlaying graphics over the real-time video during the period of the delay time.

7. The method of claim 1, further comprising generating a model mask to enable changing a color of the clothing item.

8. The method of claim 7, wherein the model mask comprises a plurality of layers, having at least color layer and texture layers.

9. The method of claim 1, further comprising generating a split screen on the monitor and displaying a real-time video on one side of the screen and playing delayed videos on another side of the screen.

10. The method of claim 1, wherein N is shorter than M.

11. The method of claim 10, wherein N is set to from one to five seconds and M is set to from five to thirty seconds.

12. The method of claim 1, wherein the trigger is generated by continuously analyzing the video feed and issuing the trigger when it is determined that the user is performing a trigger motion.

13. The method of claim 12, further comprising freezing a frame that is being displayed at the trigger time until end of counting the N seconds.

14. The method of claim 1, wherein the trigger is generated by continuously analyzing the video feed and issuing the indication when it is determined that a user has entered field of view of the camera.

15. The method of claim 1, further comprising:
flipping each frame of the video feed about a vertical axis so as to reverse right and left sides of the frame;
applying a transformation mapping to each frame of the video feed to modify the frames such that they appear to mimic a reflection of a mirror, to thereby obtain transformed frames.

16. The method of claim 15, wherein the flipping and applying a transformation mapping to each frame is done prior to sending the video feed to the monitor to be displayed as the real-time video stream and prior to saving the video feed as frames in the memory.

* * * * *